United States Patent
Hegna et al.

(10) Patent No.: US 10,132,946 B2
(45) Date of Patent: Nov. 20, 2018

(54) METHODS AND SYSTEMS THAT COMBINE WAVEFIELDS ASSOCIATED WITH GENERALIZED SOURCE ACTIVATION TIMES AND NEAR-CONTINUOUSLY RECORDED SEISMIC DATA

(71) Applicant: PGS Geophysical AS, Oslo (NO)

(72) Inventors: Stian Hegna, Hovik (NO); Gregg Parkes, Corsham (GB)

(73) Assignee: PGS Geophysical AS, Oslo (NO)

( * ) Notice: Subject to any disclaimer, the term of this patent is extended or adjusted under 35 U.S.C. 154(b) by 117 days.

(21) Appl. No.: 14/645,337

(22) Filed: Mar. 11, 2015

(65) Prior Publication Data

US 2016/0047929 A1 Feb. 18, 2016

Related U.S. Application Data

(60) Provisional application No. 62/036,914, filed on Aug. 13, 2014.

(51) Int. Cl.
    *G01V 1/36* (2006.01)
    *G01V 1/30* (2006.01)
    *G01V 1/38* (2006.01)

(52) U.S. Cl.
    CPC ............... *G01V 1/36* (2013.01); *G01V 1/30* (2013.01); *G01V 1/364* (2013.01); *G01V 1/38* (2013.01); *G01V 2210/56* (2013.01); *G01V 2210/60* (2013.01)

(58) Field of Classification Search
    CPC ... G01V 1/36; G01V 1/30; G01V 1/38; G01V 2210/60; G01V 2210/56; G01V 1/364

USPC .................................................... 367/24, 40
See application file for complete search history.

(56) References Cited

U.S. PATENT DOCUMENTS

| | | | |
|---|---|---|---|
| 3,676,841 A | 7/1972 | Anstey | |
| 4,458,339 A | 7/1984 | Wason | |
| 6,751,559 B2 | 6/2004 | Fooks et al. | |
| 6,882,938 B2 | 4/2005 | Vaage et al. | |
| 6,906,981 B2 | 6/2005 | Vaage | |
| 7,031,223 B2 | 4/2006 | Kinkead | |
| 7,359,283 B2 | 4/2008 | Vaage et al. | |
| 7,391,673 B2 | 6/2008 | Regone et al. | |

(Continued)

OTHER PUBLICATIONS

Akerberg, Peeter et al., "Simultaneous source separation by sparse Radon transform", SEG Las Vegas 2008 Annual Meeting, pp. 2801-2805.

(Continued)

*Primary Examiner* — Daniel L Murphy

(57) ABSTRACT

Systems and methods to correct source responses and perform source deghosting of a pressure or particle motion wavefield recorded using near-continuous recording of seismic data along a vessel track with generalize source activation times. The methods and systems receive a near-continuously recorded seismic data and generate a near-continuous wavefield for approximately stationary-receiver locations. Time windows of different temporal lengths are applied to traces of the near-continuous wavefield in approximately stationary-receiver locations in order to compute common-receiver gathers. The common-receiver gathers are corrected source wavefield response and source ghost effects and are combined in weighted sums to generate broadband seismic data.

21 Claims, 21 Drawing Sheets

(56) References Cited

U.S. PATENT DOCUMENTS

| | | | |
|---|---|---|---|
| 7,426,438 B1* | 9/2008 | Robertsson | G06Q 30/06 702/14 |
| 7,502,690 B2 | 3/2009 | Thomsen et al. | |
| 7,869,303 B2 | 1/2011 | Kinkead | |
| 7,916,576 B2 | 3/2011 | Beasley et al. | |
| 7,941,273 B2 | 5/2011 | Thomsen et al. | |
| 8,218,393 B2 | 7/2012 | Beasley | |
| 8,295,124 B2 | 10/2012 | Abma | |
| 8,299,794 B2 | 10/2012 | Farrelly et al. | |
| 8,345,510 B2 | 1/2013 | Hegna et al. | |
| 8,395,966 B2 | 3/2013 | Moore et al. | |
| 8,427,901 B2 | 4/2013 | Lunde et al. | |
| 8,559,270 B2 | 10/2013 | Abma | |
| 8,588,025 B2 | 11/2013 | Moldoveanu et al. | |
| 8,596,409 B2 | 12/2013 | Parkes et al. | |
| 8,724,428 B1* | 5/2014 | Sallas | G01V 1/005 367/38 |
| 8,730,760 B2 | 5/2014 | Cambois et al. | |
| 8,730,766 B2* | 5/2014 | Lambert | G01V 1/36 367/178 |
| 2008/0019214 A1 | 1/2008 | Pramik | |
| 2009/0323472 A1 | 12/2009 | Howe | |
| 2009/0326895 A1 | 12/2009 | Beasley | |
| 2010/0302900 A1 | 12/2010 | Tenghamn | |
| 2011/0079461 A1 | 4/2011 | Allen et al. | |
| 2011/0141850 A1 | 6/2011 | Scott et al. | |
| 2012/0014212 A1 | 1/2012 | Eick et al. | |
| 2012/0014213 A1 | 1/2012 | Eick et al. | |
| 2012/0033525 A1 | 2/2012 | Abma et al. | |
| 2012/0033526 A1 | 2/2012 | Hegna et al. | |
| 2012/0113747 A1* | 5/2012 | Ferber | G01V 1/005 367/21 |
| 2012/0147699 A1 | 6/2012 | Dellinger et al. | |
| 2012/0147701 A1 | 6/2012 | Ross et al. | |
| 2012/0155217 A1 | 6/2012 | Dellinger et al. | |
| 2012/0155218 A1 | 6/2012 | Beasley et al. | |
| 2012/0176861 A1 | 7/2012 | Abma et al. | |
| 2013/0028051 A1 | 1/2013 | Barkved et al. | |
| 2013/0088235 A1 | 4/2013 | Hegna et al. | |
| 2013/0088938 A1 | 4/2013 | Aaron et al. | |
| 2013/0121109 A1 | 5/2013 | Baardman et al. | |
| 2013/0322205 A1 | 12/2013 | Widmaier et al. | |
| 2014/0140168 A1 | 5/2014 | Howe | |

OTHER PUBLICATIONS

Spitz, Simon, et al., "Simultaneous source separation: a prediction-subtraction approach", SEG Las Vegas 2008 Annual Meeting, pp. 2811-2815.

Howe, Dave, et al., "Indepedent Simultaneous Sweeping in Libya—full scale implementation and new developments", SEG Houston 2009 International Exposition and Annual Meeting, pp. 109-111.

Jiang, Zhiyong and Ray Abma, "An analysis on the simultaneous imaging of simultaneous source data", SEG Denver 2010 Annual Meeting, pp. 3115-3119.

Abma, Ray, et al., "An Overview of BP's Marine Independent Simultaneous Source field trials", SEG Las Vegas 2012 Annual Meeting, pp. 1-5.

Zhang, Qie, et al., "A marine node simultaneous source acquisition trial at Atlantis, Gulf of Mexico", SEG Houston 2013 Annual Meeting, pp. 99-103.

Abma, Ray, et al. "Popcorn shooting: Sparse inversion and the distribution of airgun array energy over time", SEG Houston 2013 Annual Meeting, pp. 31-35.

Alexander, Gino, et al., "Processing results of simultaneous source surveys compared to conventional surveys", SEG Houston 2013 Annual Meeting, pp. 104108.

* cited by examiner

METHODS AND SYSTEMS THAT COMBINE WAVEFIELDS ASSOCIATED WITH GENERALIZED SOURCE ACTIVATION TIMES AND NEAR-CONTINUOUSLY RECORDED SEISMIC DATA

CROSS-REFERENCE TO A RELATED APPLICATION

This application claims the benefit of Provisional Application 62/036,914, filed Aug. 13, 2014.

BACKGROUND

In recent years, the petroleum industry has invested heavily in the development of improved marine survey techniques and seismic data processing methods in order to increase the resolution and accuracy of seismic images of subterranean formations. Marine surveys illuminate a subterranean formation located beneath a body of water with acoustic signals produced by one or more submerged sources. A source may be composed of an array of source elements, such as air guns or marine vibrators. The acoustic signals travel down through the water and into the subterranean formation. At interfaces between different types of rock or sediment of the subterranean formation, a portion of the acoustic signal energy may be refracted, a portion may be transmitted, and a portion may be reflected back toward the formation surface and into the body of water. A typical marine survey is carried out with a survey vessel that passes over the illuminated subterranean formation while towing elongated cable-like structures called streamers. The streamers may be equipped with a number of receivers for detecting and/or measuring seismic energy. Often, the receivers may be collocated pressure and particle motion sensors that detect pressure and particle motion wavefields, respectively, associated with the acoustic signals reflected back into the water from the subterranean formation. The pressure sensors may generate seismic data that represents the pressure wavefield ("pressure data"), and the particle motion sensors may generate seismic data that represents the particle motion, particle velocity, or particle acceleration wavefield ("particle motion data"). Equipment on the survey vessel may receive and record the seismic data generated by the receivers.

In a typical marine survey, seismic data is recorded in separate shot records while the survey vessel is moving. Each shot record is created by activating the source elements of a source at the same time or alternatively within a short activation time interval (e.g., about 1-3 seconds) followed by recording resultant wavefields in a longer recording time interval (e.g., about 8-12 seconds). The seismic data recorded in a shot record is treated in seismic data processing as if the seismic data was created as a result of a single source activation at the beginning of the shot record. In reality, however, the seismic data recorded in a shot record typically includes remnant energy from earlier source activations. This remnant energy is called "shot-generated noise" that appears in the final seismic images. In addition, the total wavefield generated by a source and the portion of the wavefield that propagates upward and is reflected down from the free surface, called the "source ghost," is limited in spectral content by the source elements, the depth of the source elements, the relative positions of the source elements with respect to each other, and the distance between source activations. In a typical marine seismic survey, a source with the same configuration is activated for every shot record. As a result, the spectral constraints imposed by the source element configuration are present throughout the marine seismic survey. Geophysicists and those working in marine seismology seek methods and systems that overcome the spectral constraints and the shot generated noise imposed by conventional source element configurations and activation.

DETAILED DESCRIPTION

Figure 1A:
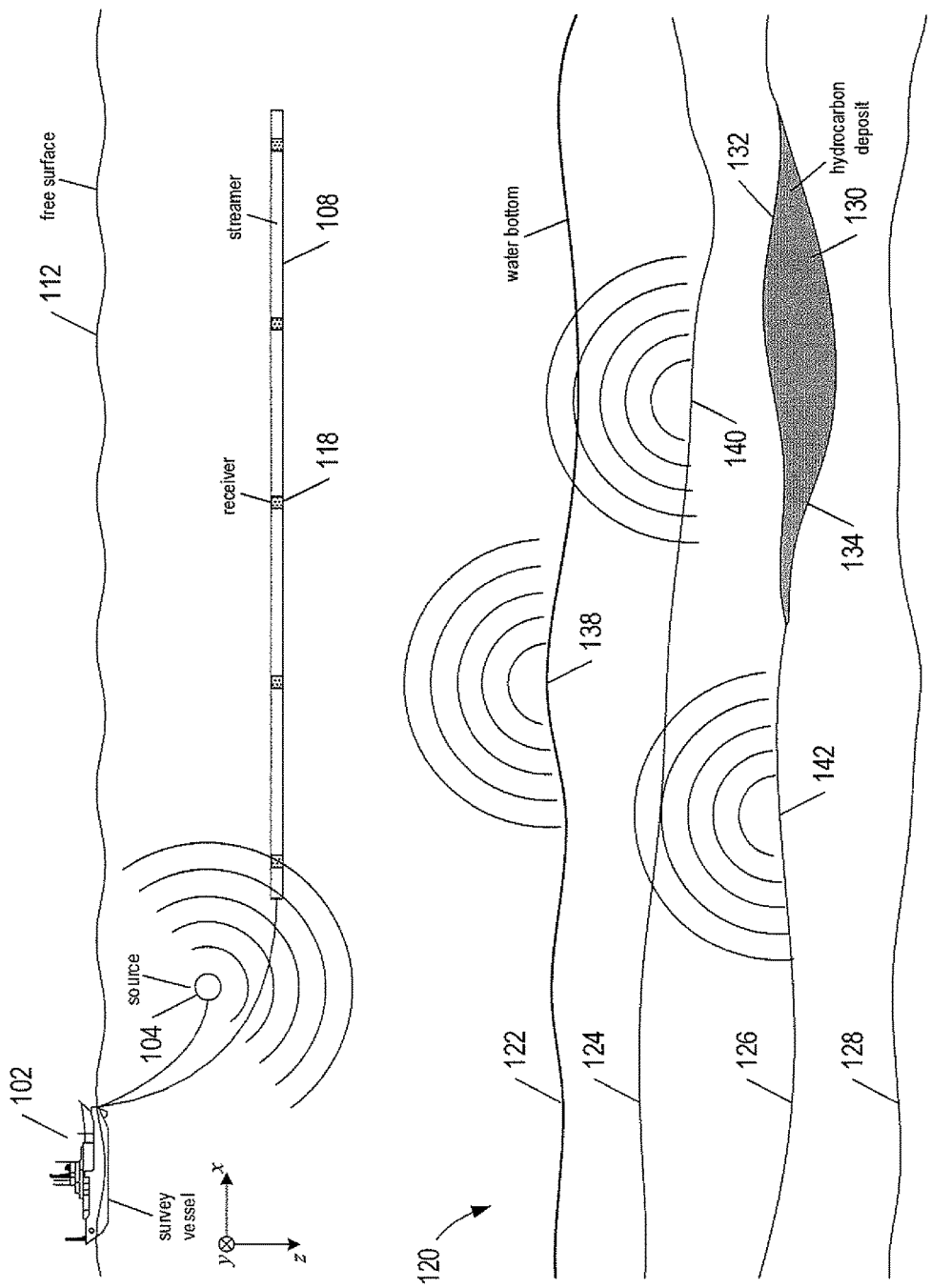
FIGS. 1A-1B show side-elevation and top views of an example seismic data acquisition system.

The disclosure is directed to methods and systems that combine wavefields generated by subsets of a source element (such as an air gun or marine vibrator) of a source and recorded in near-continuously recorded seismic data. Unlike conventional seismic data recorded in shot records, near-continuously recorded seismic data is produced by near-continuously recording seismic data while source elements of a source are activated with generalized source activation times and at generalized source locations along a vessel track (which may or may not be linear). Different portions of near-continuously recorded seismic data correspond to different activation times of the source elements and different locations where the source elements are activated along the vessel track. Also, the distances traveled between the source element activations may be more varied after each activation than for source element activations associated with seismic data recorded in shot records. Near-continuously recorded seismic data is not restricted by spectral constraints of one particular configuration of source elements and the distance traveled between activation times of source elements.

Methods and systems described herein correct near-continuously recorded seismic data for relative motion of the receivers to produce common-receiver-location traces. Each common-receiver-location trace consists of seismic data recorded at approximately stationary-receiver locations. Methods and systems apply a series of time windows to each common-receiver-location trace. The seismic data in each time window is associated with different source elements activated at different locations and times. The temporal length of the time windows generally determines the spatial extent and number of source elements that produced the seismic data in each time window. In other words, source element geometries and configurations may be controlled by the temporal length of the time windows. Because the source elements associated with each time window may have been activated at different times, the seismic data in each time window may be corrected as if the source elements had been activated at the same time. The resulting seismic data in each time window may be used to form a common-receiver gather. The common-receiver gather may be corrected for source wavefield responses and source ghost effects to form a corrected common-receiver gather. Methods and systems use time windows, which may be of variable length, to estimate the configuration of source elements that correspond to the seismic data in each time window, resulting in a number of corrected common-receiver gathers associated with different temporal lengths for the same common-receiver-location trace. The corrected common-receiver gathers produced from the same common-receiver-location trace may be combined in a weighted manner to produce optimum broadband seismic data in the form of a broadband common-receiver gather. The time window lengths may be optimized such that the combination of the resulting array responses is as broadband as possible.

Figure 1B:
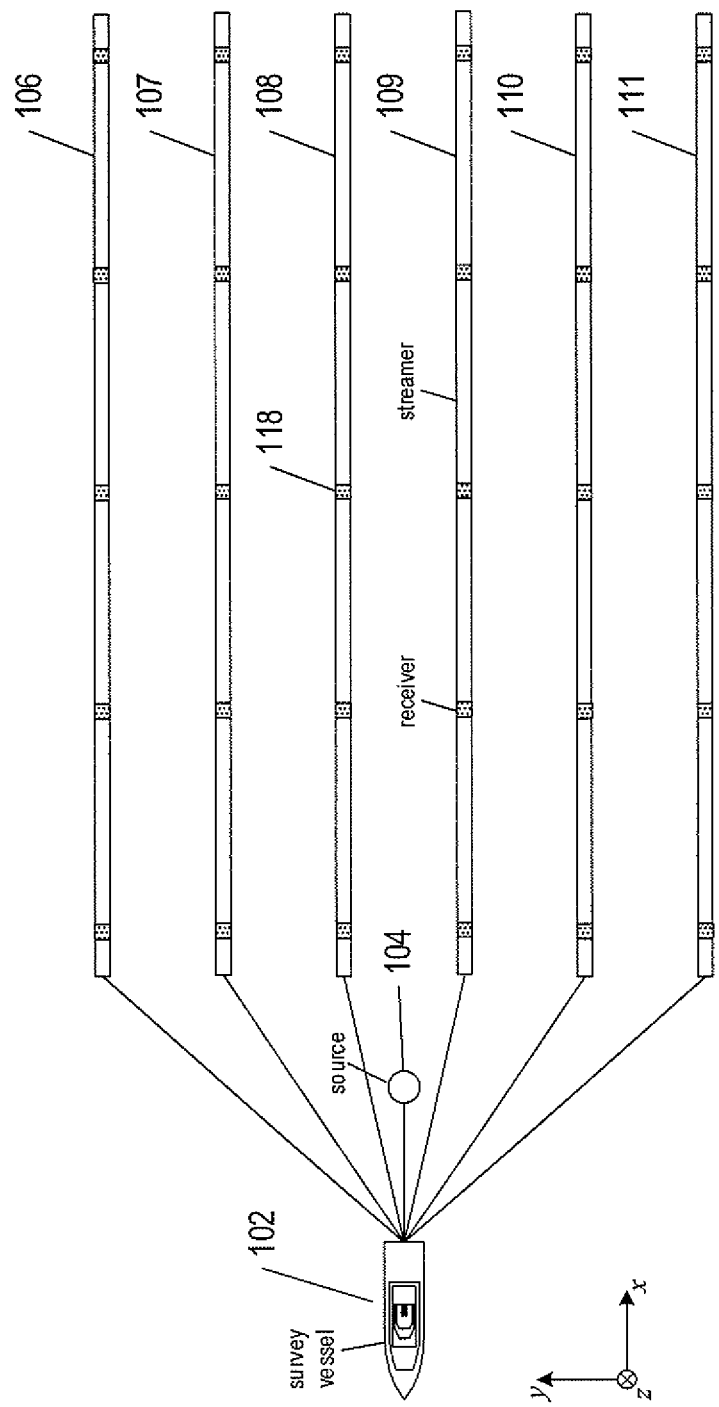

FIGS. 1A-1B show side-elevation and top views, respectively, of an example seismic data acquisition system composed of a survey vessel 102 towing a source 104 and six separate streamers 106-111 beneath a free surface 112 of a body of water. The body of water can be, for example, an ocean, a sea, a lake, or a river, or any portion thereof. In this example, each streamer is attached at one end to the survey vessel 102 via a streamer-data-transmission cable. The illustrated streamers 106-111 form a planar horizontal data acquisition surface with respect to the free surface 112. However, in practice, the data acquisition surface may be smoothly varying due to active sea currents and weather conditions. In other words, although the streamers 106-111 are illustrated in FIGS. 1A and 1B and subsequent figures as straight and substantially parallel to the free surface 112, in practice, the towed streamers may undulate as a result of dynamic conditions of the body of water in which the streamers are submerged. A data acquisition surface is not limited to having a planar horizontal orientation with respect to the free surface 112. The streamers may be towed at depths that angle the data acquisition surface with respect to the free surface 112 or one or more of the streamers may be towed at different depths. A data acquisition surface is not limited to six streamers as shown in FIG. 1B. In practice, the number of streamers used to form a data acquisition surface can range from as few as one streamer to as many as 20 or more streamers. It should also be noted that the number of sources is not limited to a single source. In practice, the number of sources selected to generate acoustic energy may range from as few as one source to three or more sources and the sources may be towed in groups by one or more vessels.

FIG. 1A includes an xz-plane 114 and FIG. 1B includes an xy-plane 116 of the same Cartesian coordinate system having three orthogonal, spatial coordinate axes labeled x, y and z. The coordinate system is used to specify orientations and coordinate locations within the body of water. The x-direction specifies the position of a point in a direction parallel to the length of the streamers (or a specified portion thereof when the length of the streamers are curved) and is referred to as the "in-line" direction. The y-direction specifies the position of a point in a direction perpendicular to the x-axis and substantially parallel to the free surface 112 and is referred to as the "cross-line" direction. The z-direction specifies the position of a point perpendicular to the xy-plane (i.e., perpendicular to the free surface 112) with the positive z-direction pointing downward away from the free surface 112. The streamers 106-111 are long cables containing power and data-transmission lines that connect receivers represented by shaded rectangles, such as receiver 118, spaced-apart along the length of each streamer to recording and data processing equipment and data-storage devices located on board the survey vessel 102.

Streamer depth below the free surface 112 can be estimated at various locations along the streamers using depth-measuring devices attached to the streamers. For example, the depth-measuring devices can measure hydrostatic pressure or utilize acoustic distance measurements. The depth-measuring devices can be integrated with depth controllers, such as paravanes or water kites that control and maintain the depth and position of the streamers as the streamers are towed through the body of water. The depth-measuring devices are typically placed at intervals (e.g., about 300 meter intervals in some implementations) along each streamer. Note that in other implementations buoys may be attached to the streamers and used to maintain the orientation and depth of the streamers below the free surface 112.

FIG. 1A shows a cross-sectional view of the survey vessel 102 towing the source 104 above a subterranean formation 120. Curve 122, the formation surface, represents a top surface of the subterranean formation 120 located at the bottom of the body of water. The subterranean formation 120 may be composed of a number of subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be estimated, at least in part, by analysis of seismic data collected during a marine seismic survey. As the survey vessel 102 moves over the subterranean formation 120, the source 104 may be activated to produce an acoustic signal at spatial and/or temporal intervals. Activation of the source 104 is often called a "shot." In other implementations, the source 104 may be towed by one survey vessel and the streamers may be towed by a different survey vessel. The source 104 may be an air gun, marine vibrator, or composed of an array of air guns and/or marine vibrators. FIG. 1A illustrates an acoustic signal expanding outward from the source 104 as a pressure wavefield 136 represented by semicircles of increasing radius centered at the source 104. The outwardly expanding wavefronts from the sources may be three-dimensional (e.g., spherical) but are shown in vertical plane cross section in FIG. 1A. The outward and downward expanding portion of the pressure wavefield 136 and portion of the pressure wavefield 136 reflected from the free surface 112 are called the "source wavefield." The source wavefield eventually reaches the formation surface 122 of the subterranean formation 120, at which point the source wavefield may be partially reflected from the formation surface 122 and partially refracted downward into the subterranean formation 120, becoming elastic waves within the subterranean formation 120. In other words, in the body of water, the acoustic signal is composed primarily of compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be a reflector that becomes a potential secondary point source from which acoustic and elastic wave energy, respectively, may emanate upward toward the receivers 118 in response to the acoustic signal generated by the source 104 and downward-propagating elastic waves generated from the pressure impulse. As shown in FIG. 1A, waves of significant amplitude may be generally reflected from points on or close to the formation surface 122, such as point 138, and from points on or very close to interfaces in the subterranean formation 120, such as points 140 and 142. The upward expanding waves reflected from the subterranean formation 120 are collectively the "reflected wavefield."

The waves that compose the reflected wavefield may be generally reflected at different times within a range of times following the initial source wavefield. A point on the formation surface 122, such as the point 138, may receive a pressure disturbance from the source wavefield more quickly than a point within the subterranean formation 120, such as points 140 and 142. Similarly, a point on the formation surface 122 directly beneath the source 104 may receive the pressure disturbance sooner than a more distant-lying point on the formation surface 122. Thus, the times at which secondary and higher-order waves are reflected from various points within the subterranean formation 120 may be related to the distance, in three-dimensional space, of the points from the activated source.

Acoustic and elastic waves, however, may travel at different velocities within different materials as well as within the same material under different pressures. Therefore, the travel times of the source wavefield and reflected wavefield reflected in response to the source wavefield may be functions of distance from the source 104 as well as the materials and physical characteristics of the materials through which the wavefields travel. In addition, the secondary expanding wavefronts may be altered as the wavefronts cross interfaces and as the velocity of sound varies in the media traversed by the wave. The superposition of waves reflected from within the subterranean formation 120 in response to the source wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

Figure 2:
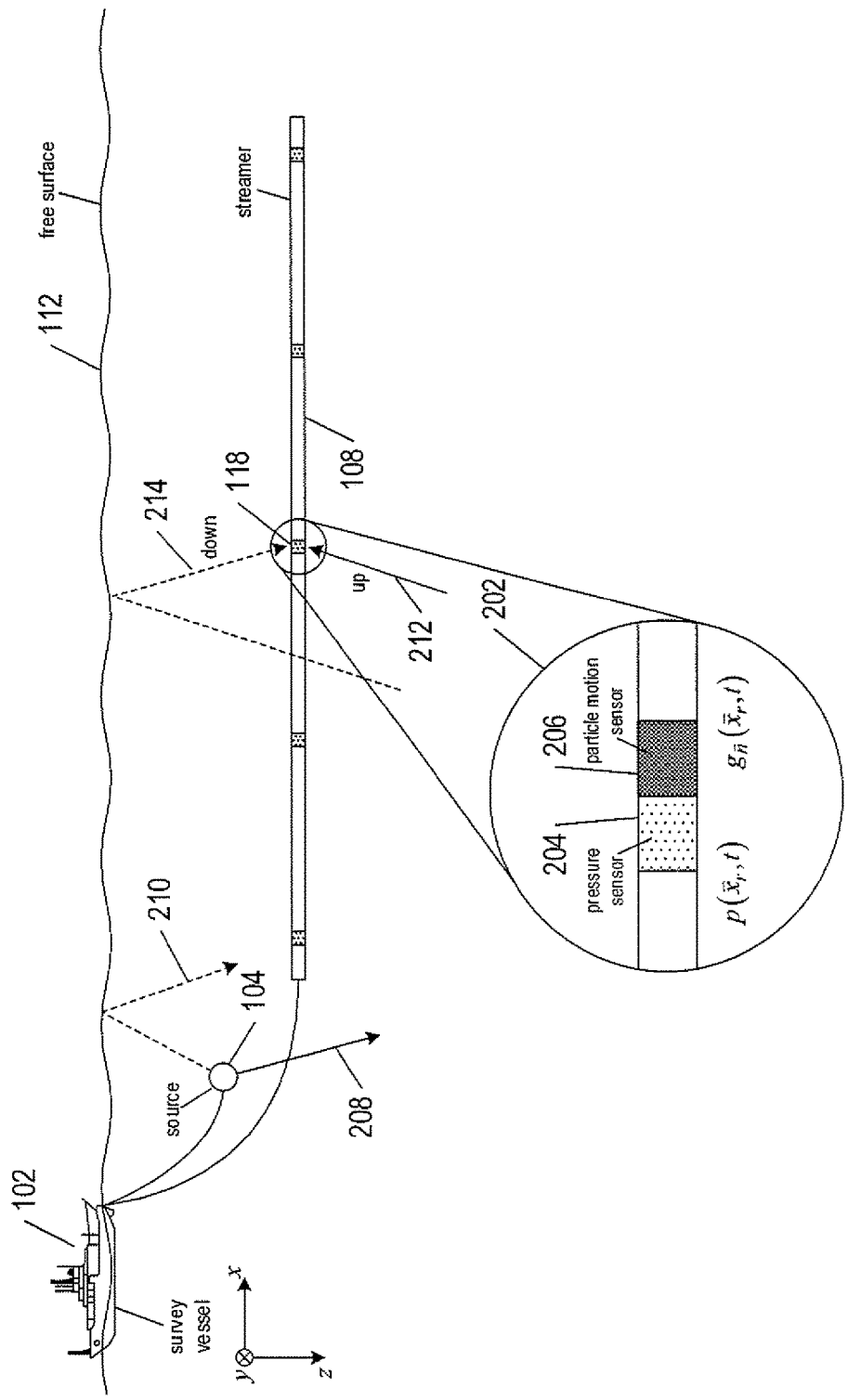
FIG. 2 shows a side-elevation view of seismic data acquisition system with a magnified view of a receiver.

Each receiver 118 may be a multi-component sensor including particle motion sensors and/or a pressure sensor. A pressure sensor detects variations in water pressure over time. The term "particle motion sensor" is a general term used to refer to a sensor that may be configured to detect particle displacement, particle velocity, or particle acceleration over time. FIG. 2 shows a side-elevation view of the seismic data acquisition system with a magnified view 202 of the receiver 118. In this example, the magnified view 202 reveals that the receiver 118 is multi-component sensors composed of a pressure sensor 204 and a particle motion sensor 206. The pressure sensor may be, for example, a hydrophone. Each pressure sensor may measure changes in hydrostatic pressure over time to produce pressure data denoted by $p(\vec{x}_r, t)$, where $\vec{x}_r$ represents the Cartesian coordinates $(x_r, y_r, z_r)$ of a receiver, subscript r is a receiver index, and t represents time. The particle motion sensors may be responsive to water motion. In general, particle motion sensors detect particle motion (i.e., displacement, velocity, or acceleration) in a direction normal to the orientation of the particle motion sensor and may be responsive to such directional displacement of the particles, velocity of the particles, or acceleration of the particles. A particle motion sensor that measures particle displacement generates particle motion data denoted by $g_{\vec{n}}(\vec{x}_r, t)$, where the vector $\vec{n}$ represents the direction along which particle displacement is measured. A particle motion sensor that measures to particle velocity (i.e., particle-velocity sensor) generates particle-velocity data denoted by $v_{\vec{n}}(\vec{x}_r, t)$. A particle motion sensor that measures particle acceleration (i.e., accelerometer) generates particle-acceleration data denoted by $a_{\vec{n}}(\vec{x}_r, t)$. The data generated by one type of particle motion sensor may be converted to another type during seismic data processing. For example, particle motion data may be differentiated to obtain particle-velocity data, and the particle-acceleration data may be integrated to obtain particle-velocity data.

The particle motion sensors are typically oriented so that the particle motion is measured in the vertical direction (i.e., $\vec{n}=(0,0,z)$) in which case $g_{\vec{n}}(\vec{x}^r, t)$ is called vertical displacement data, $v_z(\vec{x}_r, t)$ is called the vertical-particle-velocity data and $a_z(\vec{x}_r, t)$ is called the vertical-particle-acceleration data. Alternatively, each receiver may include two additional particle motion sensors that measure particle motion in two other directions, $\vec{n}_1$ and $\vec{n}_2$, that are orthogonal to $\vec{n}$ (i.e., $\vec{n} \cdot \vec{n}_1 = \vec{n} \cdot \vec{n}_2 = 0$, where "·" is the scalar product) and orthogonal to one another (i.e., $\vec{n}_1 \cdot \vec{n}_2 = 0$). In other words, each receiver may include three particle motion sensors that measure particle motion in three orthogonal directions. For example, in addition to having a particle motion sensor that measures particle velocity in the z-direction to give $v_z(\vec{x}_r, t)$, each receiver may include a particle motion sensor that measures the wavefield in the in-line direction in order to obtain the inline particle-velocity data, $v_x(\vec{x}_r, t)$, and a particle motion sensor that measures the wavefield in the cross-line direction in order to obtain the cross-line particle-velocity data, $v_y(\vec{x}_r, t)$. In certain implementations, the receivers may be composed of only pressure sensors, and in other implementations, the receivers may be composed of only particle motion sensors.

The streamers 106-111 and the survey vessel 102 may include sensing electronics and data-processing facilities that allow seismic data generated by each receiver to be correlated with the time the source 104 is activated, absolute positions on the free surface 112, and/or absolute three-dimensional positions with respect to an arbitrary three-dimensional coordinate system. The pressure data and particle motion data may be stored at the receiver, and/or may be sent along the streamers and data transmission cables to the survey vessel 102, where the data may be stored electronically or magnetically on data-storage devices located onboard the survey vessel 102. The pressure data represents a pressure wavefield, particle displacement data represents a particle displacement wavefield, particle velocity data represents a particle velocity wavefield, and particle acceleration data represents particle acceleration wavefield. The particle displacement, velocity, and acceleration wavefields are referred to as particle motion wavefields.

Returning to FIG. 2, the free surface of a body of water serves as a nearly perfect acoustic reflector, creating "ghost" effects that contaminate seismic data measured by the receivers. As described above with reference to FIG. 1, an acoustic signal output from the source 104 radiates outward in all directions, but a portion of the acoustic energy in the acoustic signal may travel generally downward directly from the source 104 to the subterranean formation as represented by directional arrow 208, and a portion may travel generally upward to the free surface 112 before being reflected downward from the free surface 112 to the subterranean formation, as represented by directional arrow 210. As a result, the reflected portion of the acoustic signal is time-delayed and trails the portion of the acoustic signal that travels directly from the source 104 into the subterranean formation. The trailing, time-delayed portion of the acoustic signal is called the "source ghost." Similarly, at each receiver, a time-delayed reflection from the free surface called a "receiver ghost" interferes with the wavefield reflected directly from the subterranean formation to the streamer. Directional arrow 212 represents the direction of an up-going wavefield at the location of receiver 118 and dashed-line arrow 214 represents a down-going wavefield produced by reflection of an up-going wavefield from the free surface 112 before reaching the receiver 118. In other words, the pressure wavefield measured by the receivers is composed of an up-going pressure wavefield and a down-going pressure wavefield, and the particle motion wavefield is composed of an up-going wavefield and a down-going wavefield. The down-going wavefield, also called the "receiver ghost wavefield," may interfere with the pressure and particle motion data generated by the receivers and may create notches in the seismic data spectral domain. Both the up-going and down-going wavefields consist of reflected energy associated with the portion of the acoustic signal that traveled directly from the source to the subterranean formation and includes a time delayed component associated with the source ghost. As a result, both low and high frequency information measured by the receivers may be compromised, and the earth cannot be fully imaged over a full range of seismic frequencies. Methods described in greater detail below effectively remove source-ghost contamination of near-continuous wavefields measured by the receivers.

As explained above, each pressure sensor 204 and particle motion sensor 206 may generate seismic data that may be stored in data-storage devices located onboard the survey vessel. Each pressure sensor and particle motion sensor may include an analog-to-digital converter that converts time-dependent analog signals into discrete time series that consist of a number of consecutively measured values called "amplitudes" separated in time by a sample rate. The time series generated by a pressure or particle motion sensor is called a "trace," which may consist of thousands of samples collected at a typical sample rate of about 1 to 5 ms. A trace is a recording of a subterranean formation response to acoustic energy that passes from an activated source, into the subterranean formation where a portion of the acoustic energy is reflected and/or refracted and ultimately detected by a receiver as described above. A trace records variations in a time-dependent amplitude that represents acoustic energy in the portion of the reflected wavefield measured by the receiver. The coordinate location of each time sample generated by a moving receiver may be calculated from global position information obtained from one or more global positioning devices located along the streamers, survey vessel, and buoys and the known geometry and arrangement of the streamers and receivers. As a result, each trace is an ordered set of discrete spatial- and time-dependent pressure or motion sensor amplitudes denoted by:

$$tr(r) = \{c^r(x_j^r, y_j^r, t_j)\}_{j=1}^J \quad (1)$$

where $c^r$ may represent pressure, particle displacement, particle velocity, or particle acceleration amplitude;

$(x_j^r, y_j^r)$ are spatial coordinates of the sensor at sample time $t_j$;

superscript "r" indicates a receiver; and

J is the number of time samples in the trace.

As explained above, the reflected wavefield typically arrives first at the receivers located closest to the sources. The distance from the sources to a receiver is called the "source-receiver offset," or simply "offset," which creates a delay in the arrival time of a reflected wavefield from an interface within the subterranean formation. A larger offset generally results in a longer arrival time delay. The traces are collected to form a "gather" that can be further processed using various seismic data processing techniques in order to obtain information about the structure of the subterranean formation.

Figure 3:
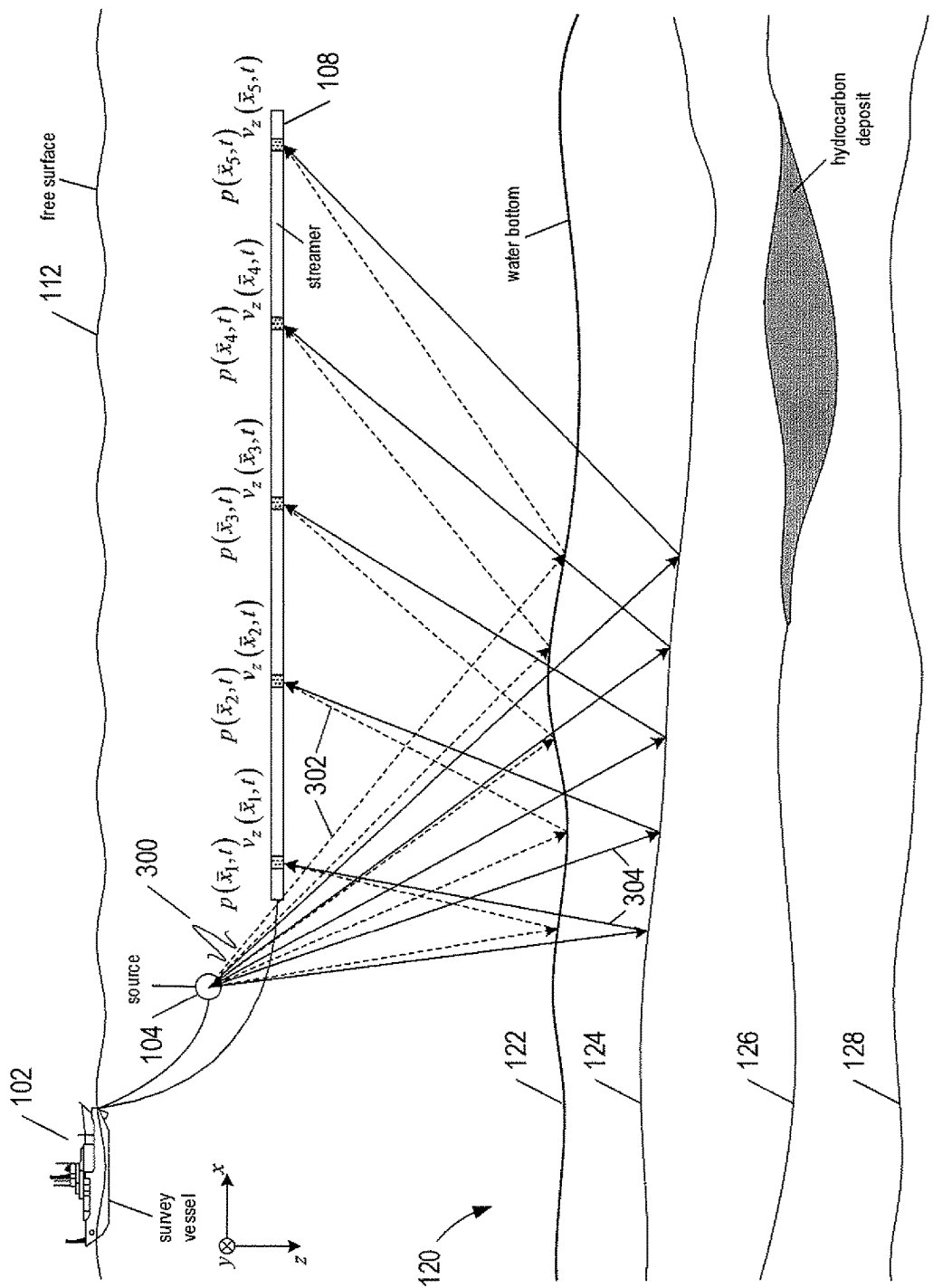
FIG. 3 shows an example of acoustic energy ray paths emanating from a source.

FIG. 3 shows example ray paths of an acoustic signal 300 that travels from the first source 104 to or into the subterranean formation 120. Dashed-line rays, such as rays 302, represent acoustic energy reflected from the formation surface 122 to the receivers 118 located along the streamer 108, and solid-line rays, such as rays 304, represent acoustic energy reflected from the interface 124 to the receivers 118 located along the streamer 108. Note that for simplicity of illustration only a handful of ray paths are represented. Each pressure sensor may measure the pressure variations, and each particle motion sensor may measure the particle motion, velocity, or acceleration of the acoustic energy reflected from the subterranean formation 120 or interfaces therein. In the example of FIG. 3, the particle motion sensors located at each receiver 118 measure vertical-particle-velocity of the wavefield emanating from the subterranean formation 120. The pressure data and/or particle motion data generated at each receiver may be time sampled and recorded as separate traces. In the example of FIG. 3, the collection of traces generated by the receivers 118 along the streamer 108 for a single activation of the source 104 may be collected to form a "common-shot gather" or simply a "shot gather." The traces generated by the receivers located along each of the other five streamers for the same activation may be collected to form separate common-shot gathers, each associated with one of the streamers.

Figure 4:
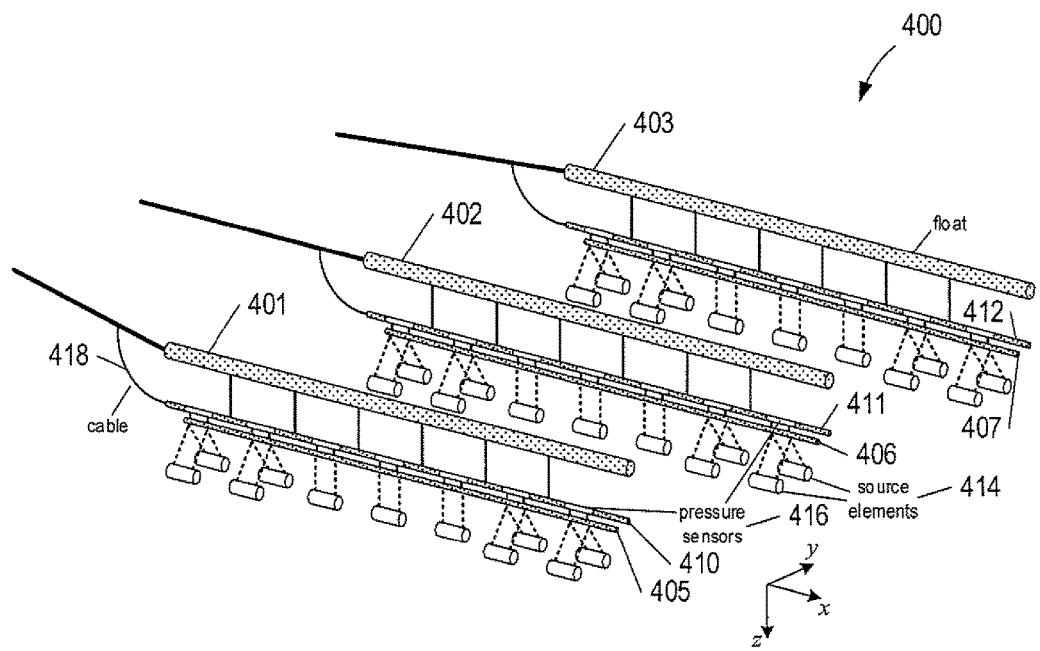
FIGS. 4-5 show isometric and side elevation views, respectively, of an example source.
Figure 5:
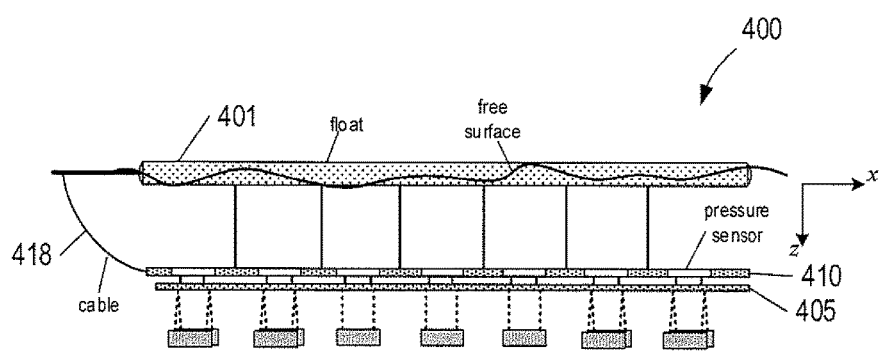

The source 104 towed behind the vessel 102 may consist of a number of source elements. FIGS. 4-5 show isometric and side elevation views, respectively, of an example source 400 with floats 401-403 and rods 405-407 suspended below the floats. The source 400 may include pressure sensing rods 410-412 suspended between the floats 401-403 and the rods 405-407. Eleven source elements, such as source elements 414, may be suspended from each of the rods. For example, the source elements may be any acoustic source, such as air guns, water guns, or marine vibrators. Each pressure sensing rod may include seven pressure sensors, such as pressure sensors 416, connected to data transmission cables, such as data transmission cable 418 that is capable of transmitting pressure sensor data to a survey vessel that tows the source 400. In this example, each pressure sensor is positioned in close proximity to one or two source elements in order to measure the near-field pressure wavefield from above the one or two source element. In other source implementations, pressure sensors may be located above the source elements.

Figure 6:
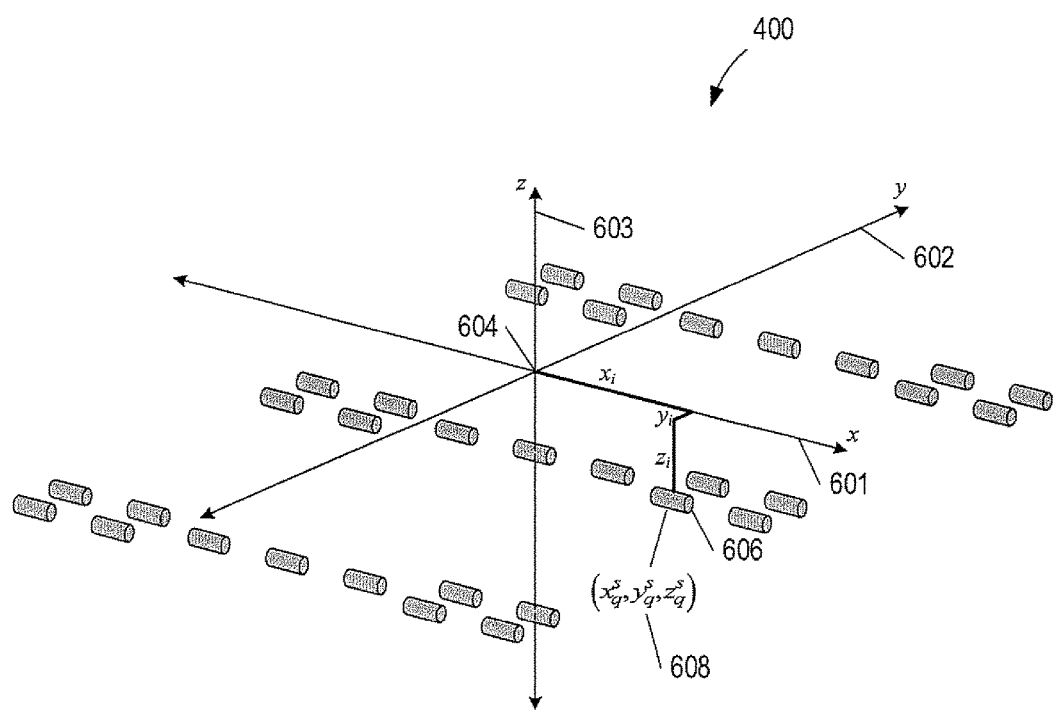
FIG. 6 shows an example of a coordinate system used to assign coordinate locations of source elements of the example source.

FIG. 6 shows an example of a Cartesian coordinate system used to assign coordinate locations to the 33 source elements of the example source 400, shown in FIG. 4. Shaded cylinders represent the source elements. The coordinate system includes an x-axis 601, a y-axis 602, and a z-axis 603. In this example, the x- and y-axes 601 and 602 correspond to the in-line and cross-line directions of the streamers towed by a survey vessel, as described above with reference to FIG. 1, and the origin 604 of the coordinate system corresponds to the center of the source elements. For example, source element 606 has coordinates $(x_q^s, y_q^s, z_q^s)$ 608 that identify the location of the source element 606 with respect to the center 604 of the source, where the superscript "s" represents source element and subscription "q" is a source element subscript. Implementations are not limited to the source coordinate system centered at the center of the source. In other implementations, the source coordinate system may be centered on a source element or at a point on the survey vessel that tows the source.

Note that sources are not intended to be limited to the example thirty-three source element arrays shown in FIG. 4. In practice, a typical source may be configured with one or more floats and each float may have any number of source elements suspended from the float. For example, a source may have up to 80 or more source elements. Also, a source may include a frame or structure (not shown in FIG. 4) that maintains the relative locations of the source elements within the source and prevents the floats and rods from drifting apart or together while the source is towed through a body of water by a survey vessel. In some implementations, source depth may be maintained, at least in part, by devices other than floats, such as winches, active depth-control devices, and remotely operated vehicles. In other words, the source elements are in substantially fixed locations with respect to one another while the source is towed through a body of water.

The pressure wavefield output from activated source elements may combine to form a source wavefield, which is the acoustic signal that illuminates a subterranean formation as described above with reference to FIGS. 1-3. The source elements may be selected with different chamber volumes, spacings, resonant frequencies, air stiffness, and positions in order to generate a desirable source wavefield.

Figure 7:
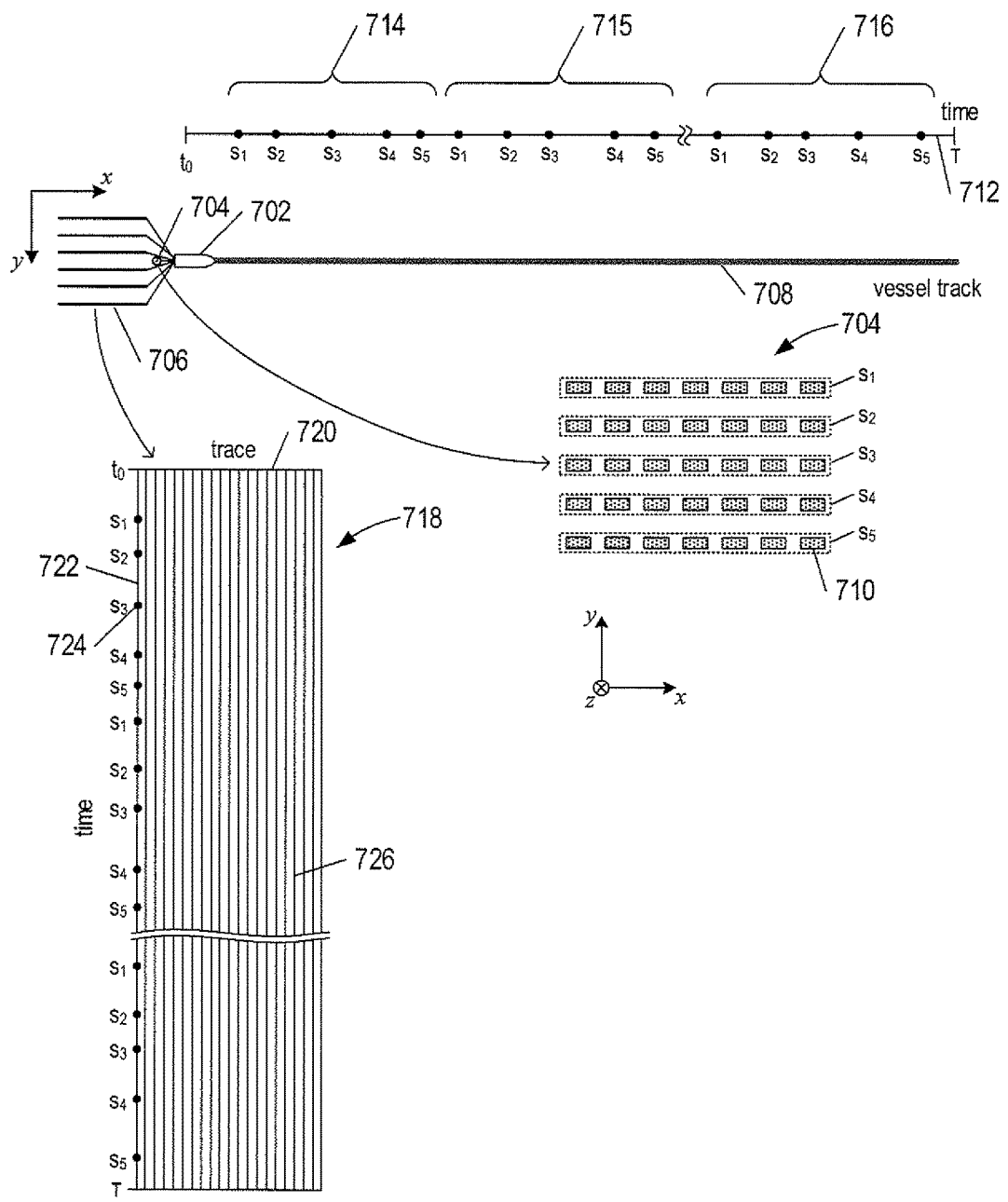
FIG. 7 shows an example of near-continuous seismic data recording.

FIG. 7 shows an example of near-continuous seismic data recording. In FIG. 7, a survey vessel 702 tows a source 704 and six streamers 706 in the in-line direction along a vessel track 708. In this example, the source 706 is composed of a 5×7 array of source elements represented by shaded rectangles, such as shaded rectangle 710. The source elements comprising the source 704 are partitioned into five subsets of source elements denoted by $s_1$, $s_2$, $s_3$, $s_4$, and $s_5$. FIG. 7 also includes a time axis 712 with a start time $t_0$ that represents the time when near-continuous seismic data recording begins, and a stop time T that represents when recording stops. With near-continuous seismic data recording, the subsets may be activated in a time-distributed manner (e.g., regular, irregular, random, or pseudo random intervals) throughout the time interval between $t_0$ and T. FIG. 7 shows an example of the subsets of source elements activated according to a repeated time-distributed sequence. Closed circles labeled $s_1$, $s_2$, $s_3$, $s_4$, and $s_5$ represent randomized or pseudo-randomized activation times for the subsets of source elements $s_1$, $s_2$, $s_3$, $s_4$, and $s_5$. The five subsets $s_1$, $s_2$, $s_3$, $s_4$ and $s_5$ are activated by repeating a time-distributed sequence indicated by brackets 714-716, in which subset $s_1$ is activated first followed by subset $s_2$, which is followed by $s_3$, which is followed by $s_4$, and subset $s_5$ activated last. After the last subset in the sequence has been activated, subset $s_5$, the sequence is repeated starting with the subset $s_1$. FIG. 7 represents a randomized or pseudo-randomized time-distributed sequence in which the sequential order is maintained but the activation times of the subsets of source elements, including the activation time of the subset $s_1$ following the activation time of the subset $s_5$, are randomized or pseudo-randomized. In another implementation, the sequential order in which the subsets of source elements are activated is maintained and the time intervals between activation times of the subsets, including the time interval between activation of the subset $s_1$ following activation of the subset $s_5$, may be fixed. In still another implementation, the sequential order in which the subsets of source elements are activated is maintained and the time interval between the activation times of the subsets may be fixed, but the activation time of the subset $s_1$ following activation of the subset $s_5$ may be randomized or pseudo-randomized. In other implementations, the subsets of source elements may be activated according to different time-distributed sequences. In other words, a subsequent time-distributed sequence may be different from a previously activated time-distributed sequence.

Figure 8:
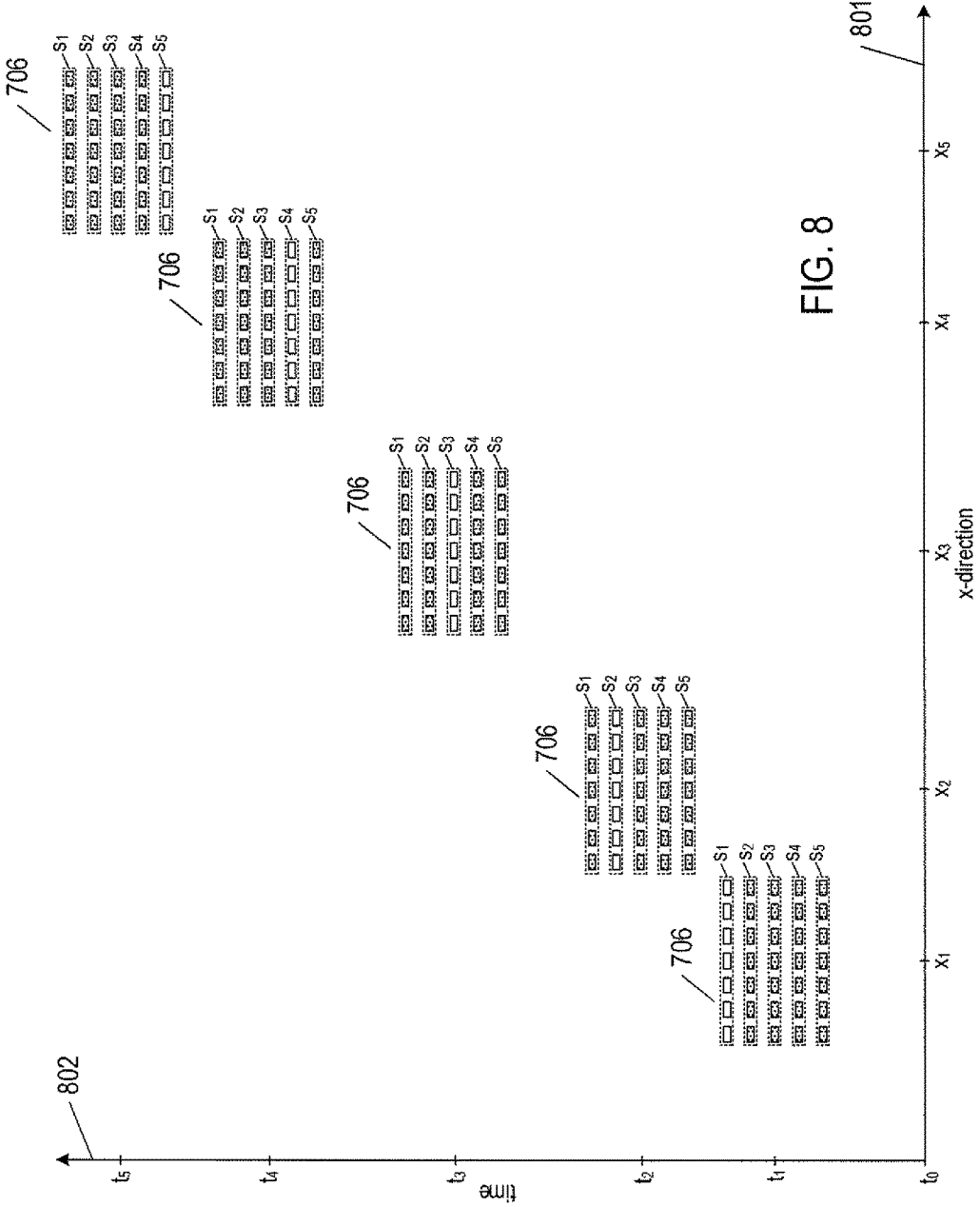
FIG. 8 shows an example plot of time versus source location of source-element subsets of a source activated according to a time-distributed sequence.

FIG. 8 shows an example plot of time versus source location with subsets of the source 706 activated according to a time-distributed sequence. Horizontal axis 801 represents the x-direction which represents the vessel track and vertical axis 802 represents time. Coordinates $x_1$, $x_2$, $x_3$, $x_4$ and $x_5$ along the x-direction 801 represent the x-coordinate of the center of the source 706 with respect to the vessel track when subsets $s_1$, $s_2$, $s_3$, $s_4$, and $s_5$ are activated at times $t_1$, $t_2$, $t_3$, $t_4$, and $t_5$ along the time axis 802. Activated source elements of the source 706 are represented by unshaded rectangles, and unactivated source elements of the source 706 are represented by shaded rectangles. For example, the source elements of the subset $s_1$ are activated at time $t_1$ and source coordinate location $x_1$. When the survey vessel 702 maintains a substantially constant rate of speed and the subsets are activated at randomized or pseudo-randomized activation times, as shown in FIG. 8, the subsets are activated at randomized or pseudo-randomized locations along the vessel track. Activation of the source elements of a subset is not limited to all of the source element activated at the same time. In other implementations, the source elements of the subsets may be randomly or pseudo-randomly activated in the time intervals. For example, the source elements comprising the subset $s_1$ may be activated at random in the time interval between the time $t_1$ and the time $t_2$.

Returning to FIG. 7, FIG. 7 additionally shows a gather 718 that represents a near-continuously recorded pressure or particle motion wavefield generated by pressure or particle motion sensors of the streamers 706 as the survey vessel 702 travels the vessel track 708. The gather includes a trace axis 720 and a time axis 722 that corresponds to the time axis 712 with times $t_0$ and T identifying the start and end of the near-continuous seismic data record. Closed circles, such as closed circle 724, represents times when a subset of source elements was activated and corresponds to the activation times identified along the time axis 712 while seismic data was near-continuously recorded. Each line in the gather 718, such as line 726, represents a single trace (wavelets not shown) near-continuously generated by the same pressure or particle motion sensor of the streamers 706 as the survey vessel 702 traveled the length of the vessel track 708.

A gather of near-continuously recorded traces of seismic data produced by a set of pressure or particle motion sensors of a seismic-data acquisition surface towed by a survey vessel traveling along a vessel track is called a "near-continuous wavefield." In practice, however, any number of the traces forming a near-continuous wavefield may include breaks or blank places where no seismic data is recorded due to equipment stoppage, breakdown, or malfunction. For example, a near-continuous wavefield may have any number of traces with complete, uninterrupted time samples while other traces in the same near-continuous wavefield may have breaks or blank places due to receiver perturbations and/or interruptions in data transmission from certain receivers to a data-storage device. The term "near-continuous wavefield" refers to seismic-data records or gathers of time-sampled traces that have been recorded without significant interruptions and refers to seismic-data records or gathers with any number of incomplete time-sampled traces.

Vessel tracks are not restricted to straight lines as shown in FIG. 7. Vessel tracks may be curved, circular or any other suitable non-linear path. In other words, receiver locations may vary in both the x- and y-coordinate positions as a survey vessel travels a non-linear vessel track. For example, in coil shooting surveys, a survey vessel travels in a series of overlapping, near-continuously linked circular, or coiled, vessel tracks. The circular geometry of the vessel tracks acquires a wide range of offset seismic data across various azimuths in order to sample the subsurface geology in many different directions. Weather conditions and changing currents may also cause a survey vessel to deviate from linear vessel tracks.

A near-continuous wavefield may be stored as a data structure in a data-storage device located onboard a survey vessel or transmitted to and stored as a data structure in an onshore data-storage device. However, the information recorded in a near-continuous wavefield during a typical marine survey may be too large to store as a single data structure. For example, in addition to recording time sampled seismic data in each trace as the survey vessel travels along a vessel track, the data recorded with each trace may include the coordinate location of each receiver for each time sample (e.g., every 1 to 5 ms) over a long period of time as described above with reference to Equation (1). Because of the large volume of data associated with recording near-continuous wavefields, near-continuous wavefields may instead be partitioned into a series of smaller more manageable seismic-data structures called "component wavefields."

Because seismic data is recorded near-continuously while traveling a vessel track, each trace of a near-continuous wavefield is a record of the wavefield measured at different locations along the vessel track. Some disclosed methods apply a distance-correction operator to a near-continuous wavefield in order to associate each time sample with the location where the time sample was measured. The distance-correction operator applied to the near-continuous wavefield may generate a near-continuous wavefield in approximately stationary-receiver locations. The near-continuous wavefield may be corrected for moving receivers by first transforming the near-continuous wavefield from the space-time ("s-t") domain to the time-wavenumber ("t-k") domain using an FFT or a DFT:

$$c^r(x_j, y_j, t_j) \to C^r(k_x, k_y, t_j) \quad (2)$$

A general, two-dimensional distance-correction operator applied to a near-continuous wavefield obtained for a non-linear vessel track is given by:

$$O(k_x, k_y, t) = e^{-i(k_x \Delta x(t) + k_y \Delta y(t))} \quad (3)$$

where
$i = \sqrt{-1}$;
$\Delta x(t_j) = x_j^r - x_0$;
$\Delta y(t_j) = y_j^r - y_0$;
$(x_0, y_0)$ are coordinates of the receiver at the start of the survey; and
$(x_j^r, y_j^r)$ are coordinates of the receiver at sample time $t_j$.

For a two-dimensional vessel track, the distance-correction operator may be applied to each time sample of each trace of the near-continuous wavefield as follows:

$$C^r(k_x, k_y, t_j) O(k_x, k_y, t_j) = C^r(k_x, k_y, t_j) e^{-(k_x \Delta x(t) + k_y \Delta y(t))} \quad (4)$$

For a linear or one-dimensional vessel track, the y-coordinate direction (i.e., cross-line direction) may be omitted. Time samples of a near-continuous wavefield recorded for a one-dimensional vessel track are transformed from the s-t domain to the t-k domain using an FFT or a DFT:

$$c^r(x_j, t_j) \to C^r(k_x, t_j) \quad (5)$$

and the distance-correction operator reduces to:

$$O(k_x, t) = e^{-ik_x \Delta x(t)} \quad (6)$$

The distance-correction operator may be applied to each time sample of traces of the near-continuous wavefield in the t-k domain as follows:

$$C^r(k_x, t_j) O(k_x, t_j) = C^r(k_x, t_j) e^{-ik_x \Delta x(t_j)} \quad (7)$$

In alternative implementations, because the near-continuous wavefield may be large and stored as a series of component wavefields in a data-storage device, the distance-correction operators may be applied to each component wavefield to compute distance-corrected component wavefields that are concatenated to produce a near-continuous wavefield in approximately stationary-receiver locations.

The distance-corrected traces may be transformed back from the t-k domain to the s-t domain and collected to form a near-continuous wavefield in approximately stationary-receiver locations. Each trace of a near-continuous wavefield in approximately stationary-receiver locations is called a "common-receiver-location trace" composed of seismic data recorded for a approximately stationary-receiver location. The term "stationary-receiver location" does not imply that a stationary receiver was used to measure the seismic data contained in a common-receiver-location trace. Because the receivers are moving during seismic data recording as explained above, a number of traces of the near-continuous wavefield may contain seismic data measured at about the same receiver location ($x^r$, $y^r$). The distance-correction operators of Equations (3) and (6) apply a spatial correction to traces of the near-continuous wavefield to form common-receiver-location traces of a near-continuous wavefield in approximately stationary-receiver locations. Each common-receiver-location trace contains the seismic data measured at about the same receiver location by one or more receivers as if a stationary receiver had instead been placed at the location. The term "stationary-receiver location" refers to the location where seismic data is measured by one or more receivers as the receivers pass over the location and a common-receiver-location trace is a collection of that seismic data recorded at that location.

Figure 9:
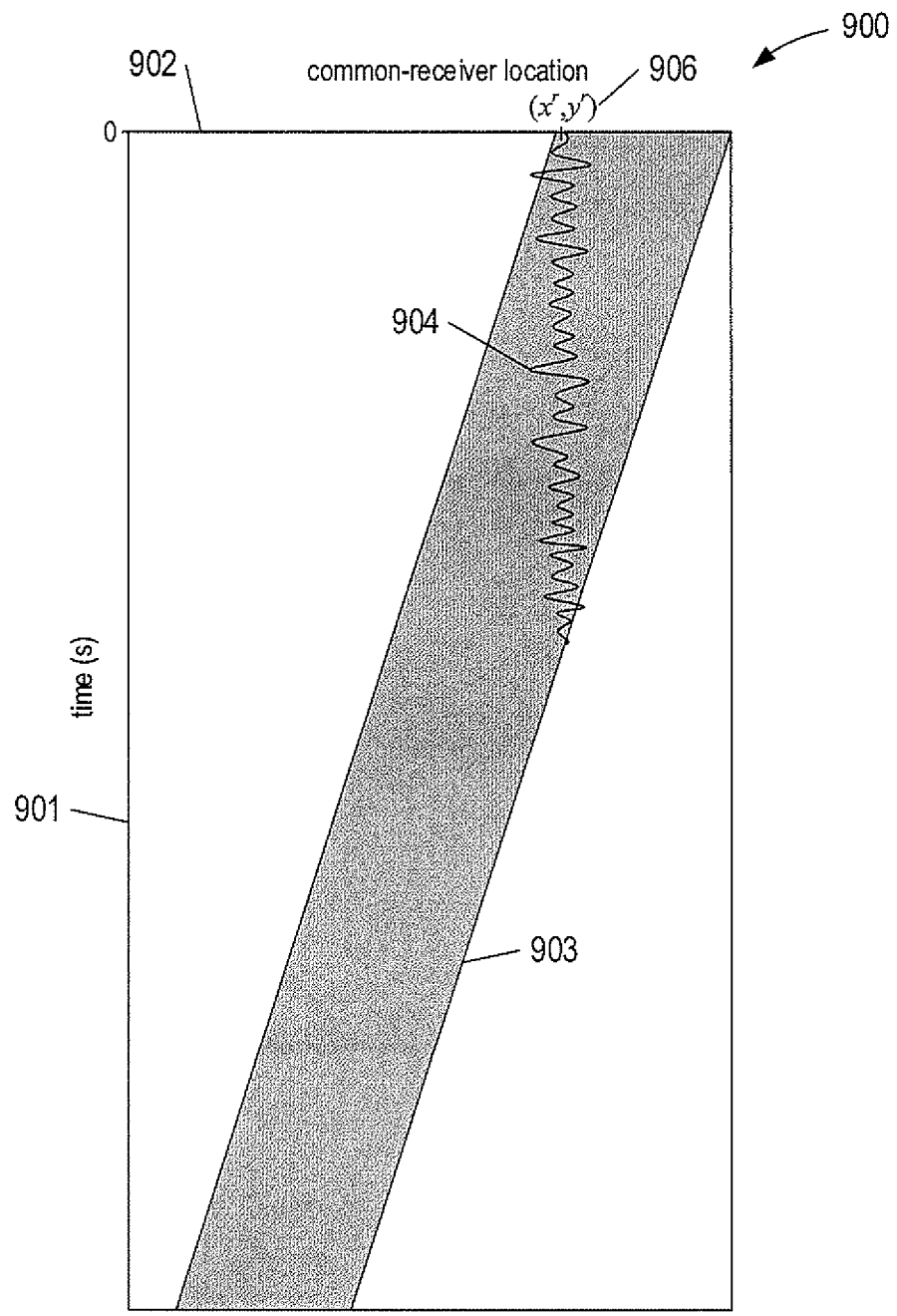
FIG. 9 shows an example near-continuous wavefield in approximately stationary-receiver locations.

FIG. 9 shows an example near-continuous wavefield in approximately stationary-receiver locations obtained from applying a distance-correction operator to a near-continuous wavefield as described above with reference to Equations (2)-(7). Vertical axis 901 represents time and horizontal axis 902 represents approximately stationary-receiver locations. Shaded region 903 is composed of traces at approximately stationary-receiver locations. The traces are common-receiver-location traces. Unshaded portions of the gather 900 do not contain seismic data. For example, a wiggle curve 904 represents a common-receiver-location trace associated with an approximately stationary-receiver location ($x^r$, $y^r$) 906. The common-receiver-location trace 904 is composed of seismic data measured by one or more pressure or particle motion sensors at the approximately stationary-receiver location ($x^r$, $y^r$). In other words, the common-receiver-location trace 904 contains the seismic data that would have been measured by a stationary pressure or particle motion sensor placed at the location ($x^r$, $y^r$).

Figure 10:
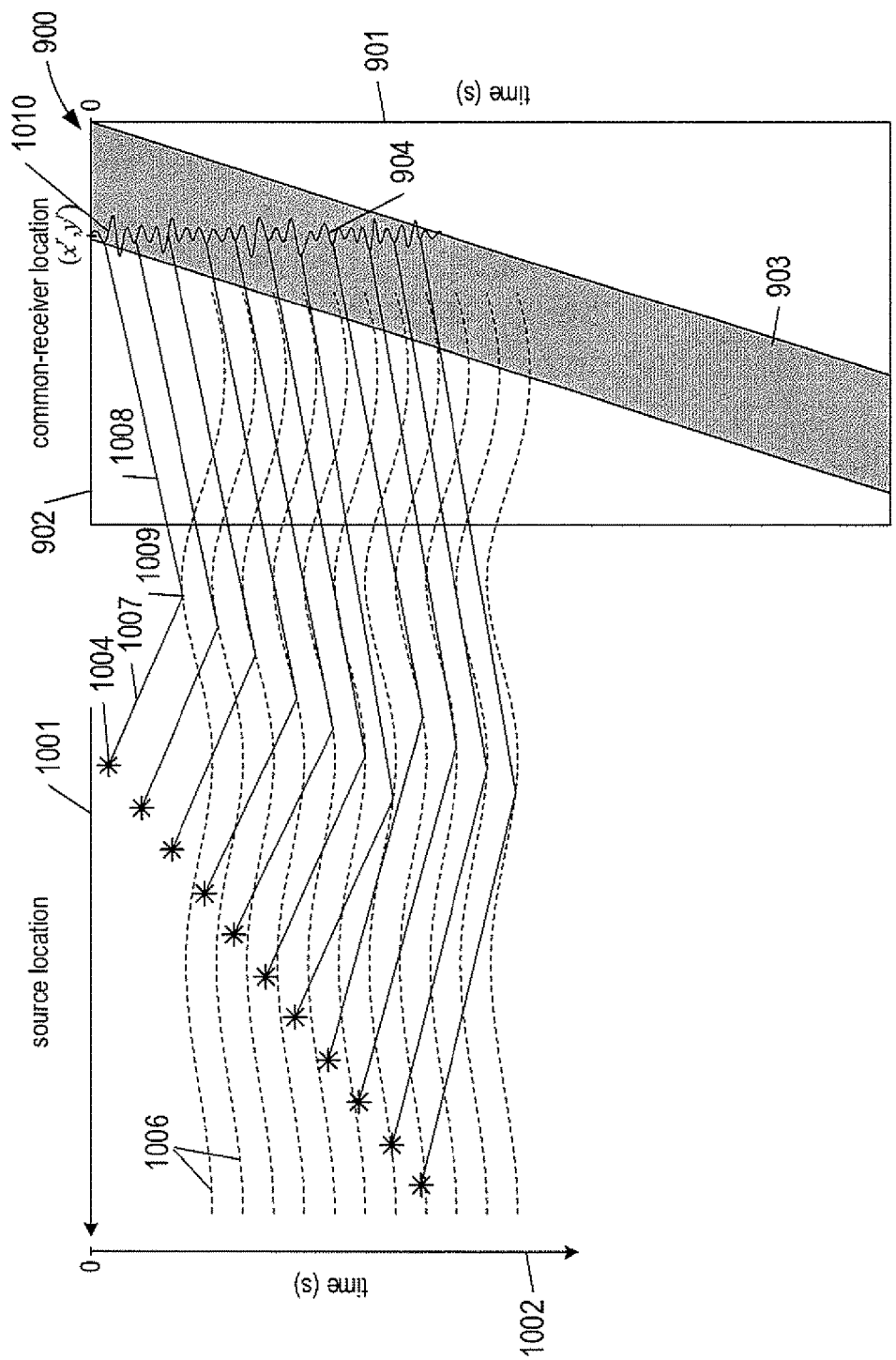
FIG. 10 shows a plot of relative source-element locations and activation times associated with a common-receiver trace.

Each common-receiver-location trace is composed of seismic data associated with one or more source elements activated at different times relative the start of the common-receiver-location trace. FIG. 10 shows a plot of relative source-element locations and activation times that correspond to seismic data recorded in the common-receiver-location trace 904 of FIG. 9. Horizontal axis 1001 represents source locations, and vertical axis 1002 represents time. Stared points, such as stared point 1004, are called "activation coordinates" that represent the in-line location and point in time when different source elements were activated. Dashed lines 1006 represent an interface of a subterranean formation at different times, and line segments connect each activation coordinate to a different reflection point on the interface and corresponding seismic data recorded in the common-receiver-location trace 904. For example, line segments 1007 and 1008 represent an interface reflection 1009 of acoustic energy generated by a source element with activation coordinates 1004 recorded as seismic data 1010 in the common-receiver-location trace 904.

Figure 11:
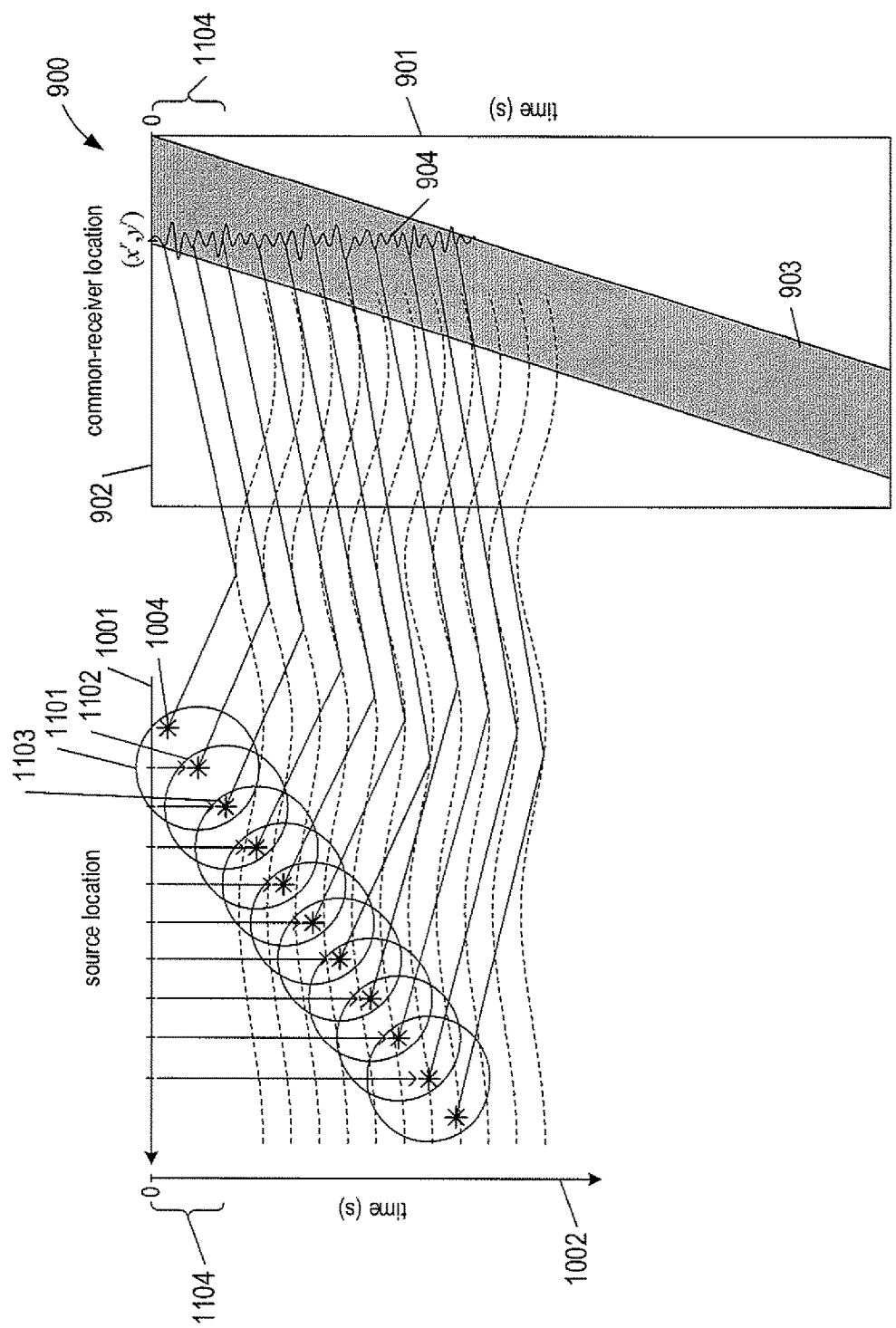
FIG. 11 shows groups of activation coordinates enclosed in circles.

Subsets of source elements activated at different spatial locations correspond to different portions of the seismic data recorded in a common-receiver-location trace. The spatial information of the source elements comprising a subset correspond to time intervals of the time axis of a common-receiver-location trace. FIG. 11 shows groups of three activation coordinates enclosed by circles. For example, circle 1101 encloses three activation coordinates 1004, 1102, and 1103. The activation coordinates 1004, 1102, and 1103 represent the different activation times and coordinate locations of a subset of three source elements that correspond to seismic data recorded in a time interval 1104 of the common-receiver-location trace 904. The time interval 1104 corresponds to the activation times of the group of activation coordinates within circle 1101.

A series of time windows is applied to a common-receiver-location trace and the source elements that correspond to the seismic data in each time window are identified. Because the source elements associated with each time window may have been activated at different times, a source-wavefield-correction operator is applied to the seismic data in each time window in order to correct the seismic data as if the source elements had been activated at the same time. The source-wavefield-correction operator is given by:

$$W(\omega) = \frac{\sum_a e^{i\omega \Delta t_a}}{\left|\sum_a e^{-i\omega \Delta t_a}\right|^2 + \varepsilon} \quad (8)$$

where
  $\omega$ is the angular frequency;
  a is a source element index of source elements associated with the time window; and
  $\Delta t_a = t_a - t_0$ with $t_a$ represents a time when the source element was activated and $t_0$ represents the near-continuous recording start time.

Seismic data collected in a time window is first transformed from the s-t domain to the s-f domain using an FFT or a DFT:

$$c^r(x_j, t_j) \rightarrow C^r(x_j, \omega_j) \quad (9)$$

Each $C^r(k_x, \omega_j)$ is multiplied by the source-wavefield-correction operator $W(\omega_j)$ as follows:

$$C^r(x_j, \omega_j) W(\omega_j) \quad (10)$$

The source-wavefield-corrected seismic data in each time window is time shifted as if the subset of source elements associated with the seismic data in each time window had been activated at the same activation time.

Figure 12A:
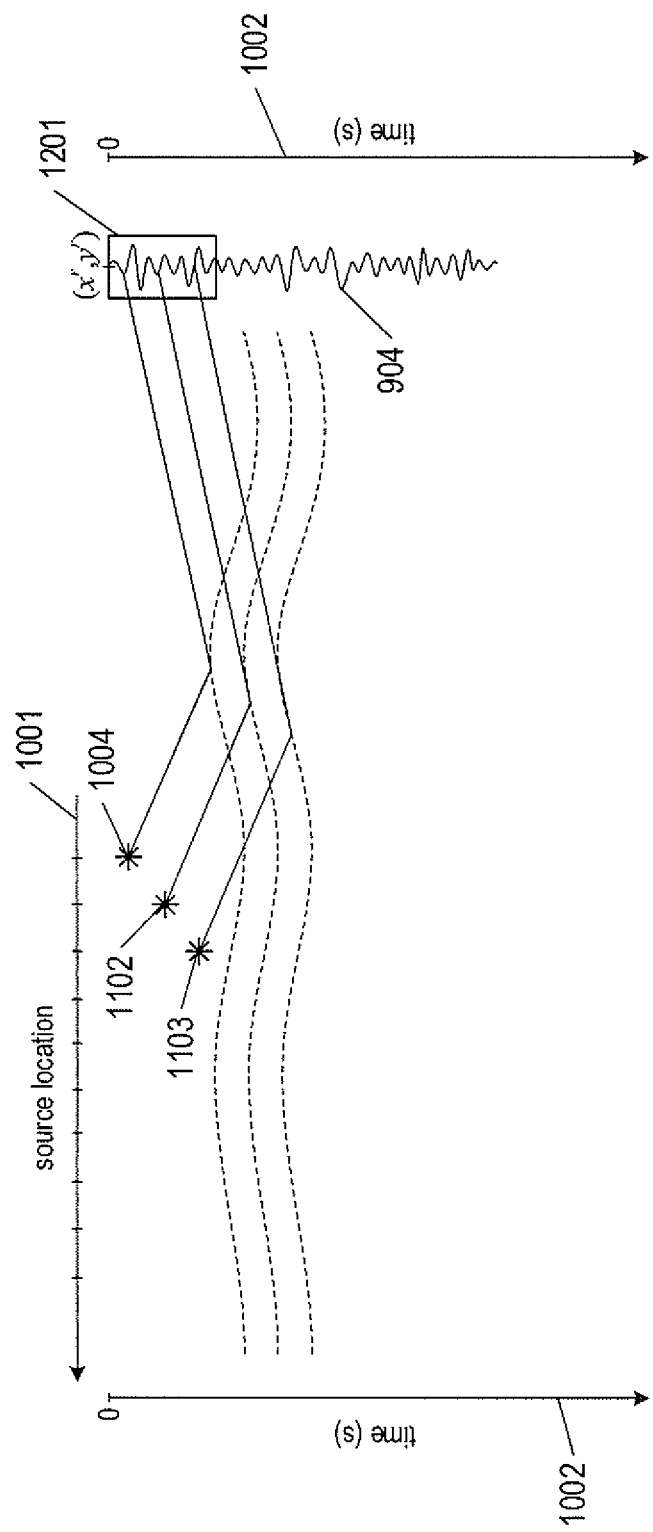
FIGS. 12A-12B show application of a source-wavefield-correction operator to a subset of source elements.
Figure 12B:
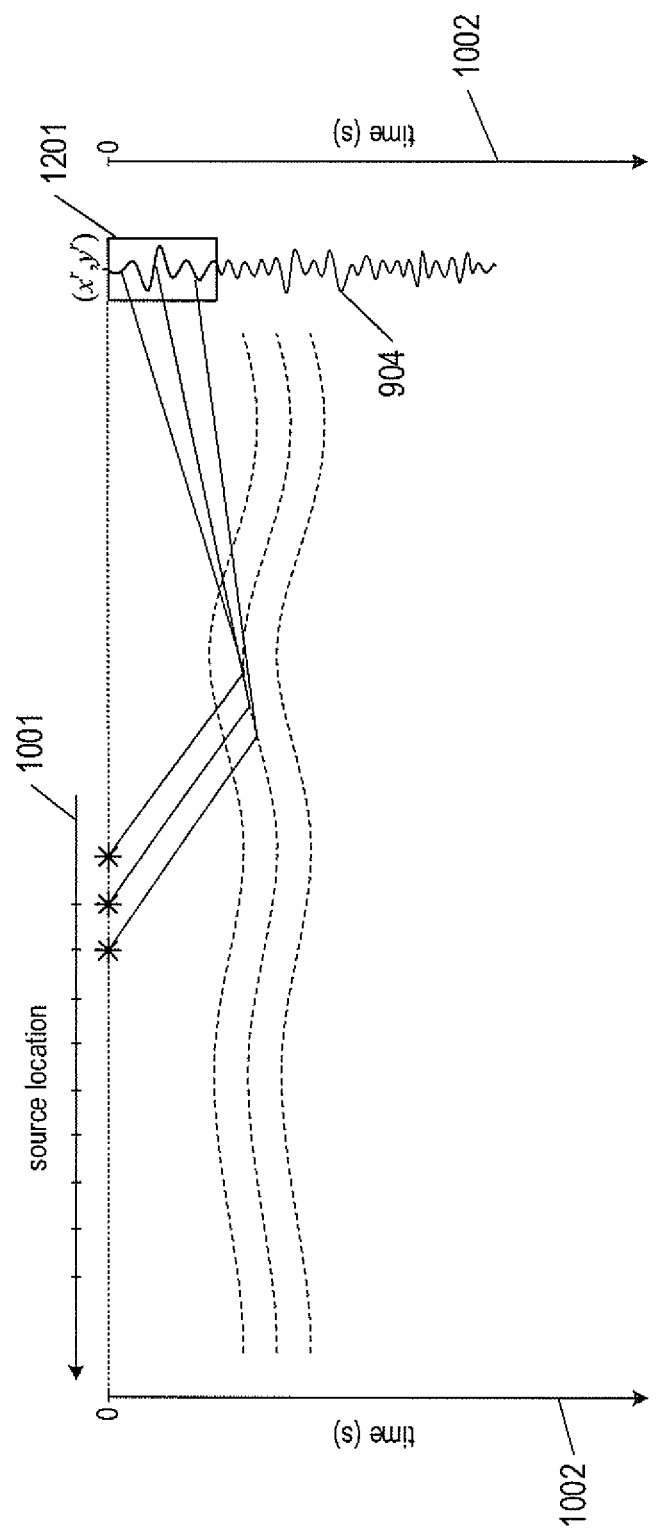

FIGS. 12A-12B show application of the source-wavefield-correction operator to a subset of source elements associated with a time window applied to the common-receiver-location trace 904. In FIG. 12A, rectangle 1201 represents a time window applied to a portion of the common-receiver-location trace 904. Source elements and activation times composed of seismic data in the time window 1201 are identified. As shown in FIG. 12A, the three source elements with activation coordinates 1004, 1102, and 1103 have activation times that are within the time window 1201. The seismic data in the time window 1201 may be transformed from the s-t domain to the s-f domain as described above with reference to Equation (9), and the source-wavefield-correction operator of Equation (8) may be applied to the transformed seismic data according to Equation (10). FIG. 12B shows activation coordinates aligned with the start of the time window 1201 (i.e., t=0) and the seismic data corrected by the source-wavefield-correction operator transformed back to the s-t domain in the time window 1201.

A series of time windows with the same temporal length may be applied to different portions of a common-receiver-location trace. The time interval between the start times of consecutive time windows may be determined by dividing a desired output spacing between the source arrays to output (i.e., the trace spacing of a resulting common-receiver gather described below) and the vessel speed. For example, when the start time of a first window is zero, the desired output spacing between source arrays is 12.5 m and the vessel speed is 2 m/s, the start time of the following time window is 6.25 seconds. The temporal length of the time windows may also be determined by dividing the desired length of the resulting source elements by the vessel speed. For example, when the desired length of the output source elements is 25 m and the vessel speed is 2 m/s, the temporal length of the time windows is 12.5 seconds. Consecutive time windows may or may not overlap in time.

Subsets of source elements with activation times that lie within the time windows may be identified. The seismic data in each time window may be transformed from the s-t domain to the s-f domain as described above with reference to Equation (9), and the source-wavefield-correction operator of Equation (8) may be applied to the transformed seismic data according to Equation (10) and then transformed back to the s-t domain.

Figure 12C:
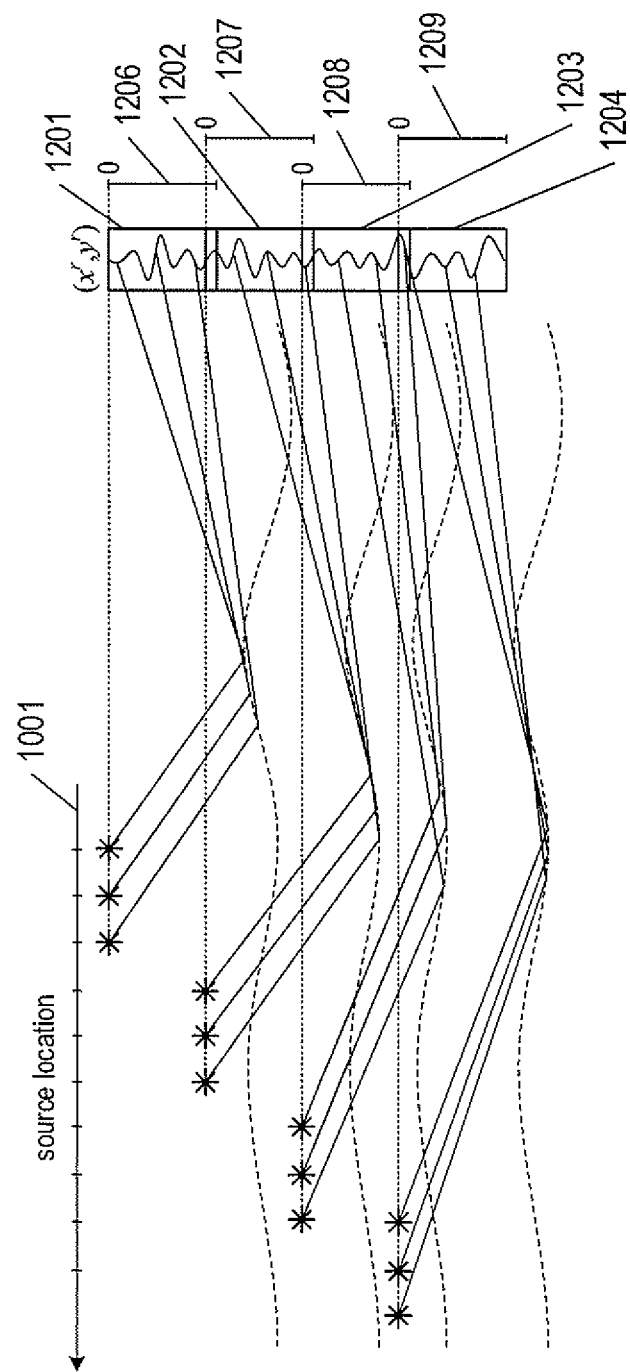
FIG. 12C shows results of applying a source-wavefield-correction operator to a common-receiver-location trace.

FIG. 12C shows an example of the source-wavefield-correction operator of Equation (8) applied to seismic data in series of time windows 1201-1204 applied to the common-receiver-location trace 904. The seismic data in each of the time windows 1201-1204 represents the seismic data of the common-receiver-location trace 904 corrected according to Equation (8). For example, the seismic data in the time window 1202 results from transforming seismic data in the same time window applied to the common-receiver-location trace 904 from the s-t domain to the s-f domain as described above with reference to Equation (9), applying the source-wavefield-correction operator of Equation (8) to the transformed seismic data according to Equation (10), and then transforming back to the s-t domain. The seismic data in each of the time windows 1201-1204 has been corrected according to Equations (8)-(10) as if the source elements associated with each time window were simultaneously activated. In particular, the source-wavefield-correction operator shifts the time associated with the seismic data in each time window as if the source elements associated with the time window were simultaneously activated at time zero and the seismic data contained in each time window started recorded at time zero. For example, FIG. 12C includes time axes 1206-1209 associated with the time windows 1201-1204, respectively. The start time for each of the time windows is zero and the activation times of the three source elements associated with each time window is zero.

Figure 12D:
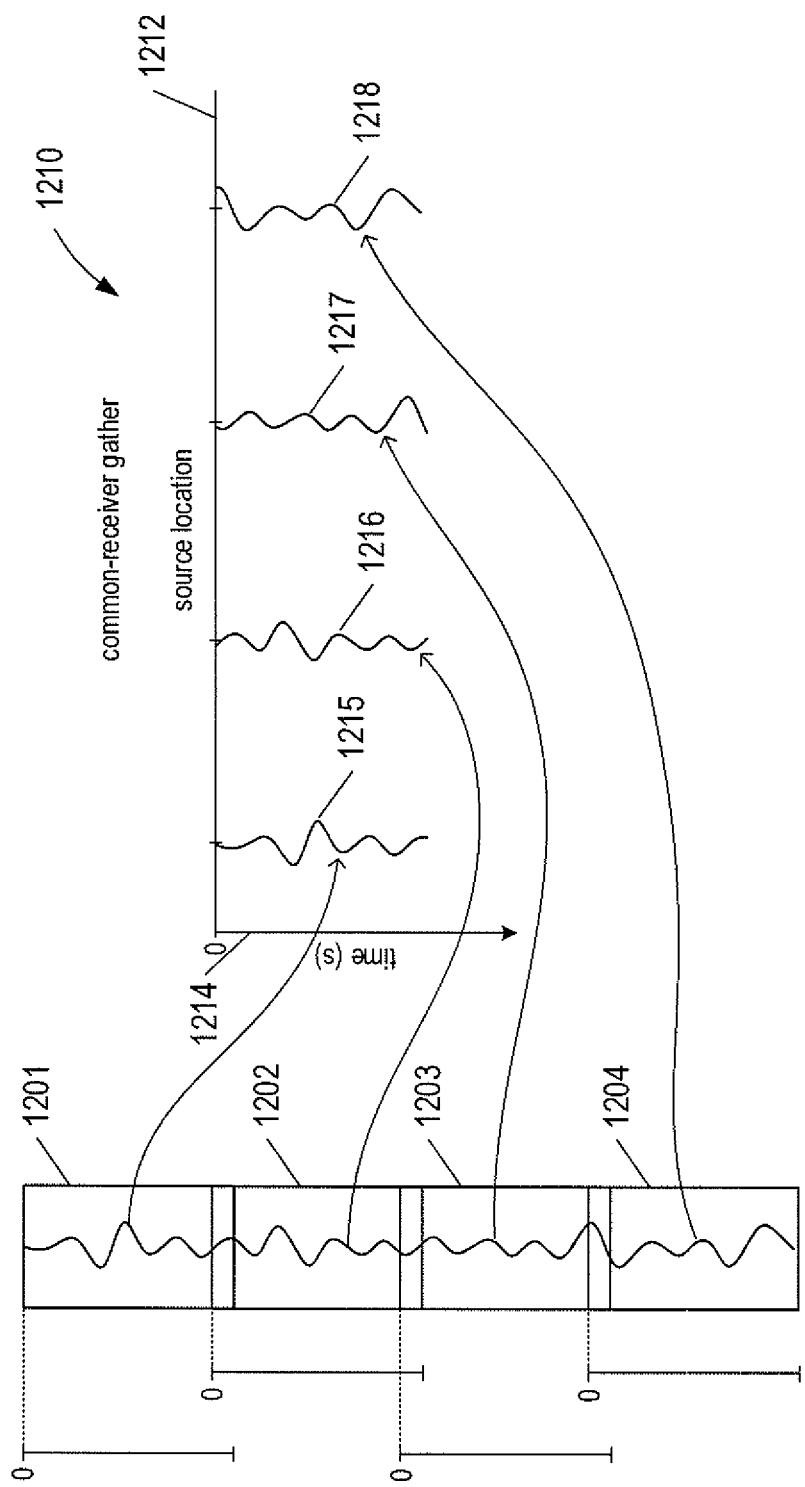
FIG. 12D shows a common-receiver gather formed from subset corrected seismic data shown in FIG. 12C.

A common-receiver gather is formed from the seismic data contained in the time windows after applying the source-wavefield correction of Equation (8). FIG. 12D shows a common-receiver gather 1210 formed from the seismic data contained in each of the time windows shown in FIG. 12C. The common-receiver gather 1210 includes a source location axis 1212 and a time axis 1214. FIG. 12D shows an example of a common-receiver gather composed of common-receiver traces 1215-1218. Each common-receiver trace is the seismic data contained in one of the time windows after source wavefield correction according to Equations (8)-(10). Common-receiver trace 1215 is the seismic data in time window 1201, common-receiver trace 1216 is the seismic data in time window 1202, common-receiver trace 1217 is the seismic data in time window 1203, and common-receiver trace 1218 is the seismic data in time window 1204. For example, common-receiver trace 1215 is the seismic data contained in time window 1201 after source wavefield correction according to each Equation (8)-(10). Each common-receiver trace of a common-receiver gather is denoted by $r_m(t)$, where m is a common-receiver trace index (also a time window index), in the s-t domain.

Each common-receiver trace $r_m(t)$ of a common-receiver gather may be contaminated with a source wavefield response and source ghost. After a common-receiver gather is computed from a common-receiver-location trace, the source-wavefield response and source-ghost effects are essentially removed from the common-receiver gather. The source-wavefield response that contaminates a common-receiver trace may be deconvolved using a source-wavefield-deconvolution operator in the f-k domain. A source-wavefield-deconvolution operator applied to the mth common-receiver trace of a common-receiver gather is given by:

$$A_m(\omega, k_x, k_y) = \frac{\overline{S}_m(\omega, k_x, k_y)}{|S_m(\omega, k_x, k_y)|^2 + \varepsilon} \quad (11)$$

where
$S_m(\omega, k_x, k_y)$ is a source-wavefield-response operator;
$\overline{S}_m(\omega, k_x, k_y)$ represents complex conjugate of $S_m(\omega, k_x, k_y)$; and
$\varepsilon$ is a stabilization parameter.

The source-wavefield-response operator $S_m(\omega, k_x, k_y)$ represents an f-k domain, source-wavefield response of a subterranean formation to a source wavefield generated by the subset of source elements associated with the mth common-receiver trace. The source-wavefield-response operator in the f-k domain may be given by:

$$S_m(\omega, k_x, k_y) = \sum_n S_n(\omega) e^{-i(k_x x_n^s + k_y y_n^s)} \quad (12)$$

where
m identifies the common-receiver trace of a common-receiver gather;
$S_n(\omega)$ is the notional source signature of a source element in the subset of source elements associated with the mth common-receiver trace;
$k_x$ is the in-line horizontal wavenumber;
$k_y$ is the cross-line horizontal wavenumber;
$x_n^s$ is the in-line coordinate of source element n relative to the geometric center of the source array; and
$y_n^s$ is the cross-line coordinate of source element n relative to the geometric center of the source array.

The source-wavefield-response operator represents a point source wavefield as a superposition of individual near wavefields emitted by each source element with respect to the later position of each source element relative to the center of the subset of source elements. Each notional source signature $S_n(\omega)$ is obtained by transforming a notional source signature of the nth source element, denoted by $s_n(t)$, from the time domain to the frequency domain using an FFT or a DFT. The source-wavefield-response operator deconvolves the source wavefield response emitted by the subset of source elements associated with the mth common-receiver trace into a point source. Each common-receiver trace of the common-receiver gather is source deghosted using a source-deghosting operator:

$$D_{g_m}(k_z) = \frac{\sum_n (e^{-ik_z z_n^s} + r' e^{ik_z z_n^s})}{\left|\sum_n (e^{ik_z z_n^s} + r' e^{-ik_z z_n^s})\right|^2 + \varepsilon} \quad (13)$$

where $$k_z = \sqrt{\left(\frac{\omega}{c}\right)^2 + k_x^2 + k_y^2};$$

r′ is the reflectivity of the free surface; and
$z_n^s$ is the depth of the nth source element.

The source-wavefield response and source-ghost effects recorded in a common-receiver gather may be removed by first transforming the traces of a common-receiver gather from the s-t domain to the f-k domain using an FFT or a DFT followed by applying the source-wavefield deconvolution operator of Equation (11) and the source-deghosting operator of Equation (13) in order to obtain $$R_e(\omega, k_x, k_y) = \sum_m R_m(\omega) e^{-i(k_x x_m + k_y y_m)} A_m(\omega, k_x, k_y) D_{g_m}(k_z) \quad (14)$$

where
m is a common-receiver gather trace index;
($x_m$, $y_m$) are in-line and cross-line coordinates of a common-receiver trace;
and
$R_m(\omega)$ represents the mth common-receiver trace of the common-receiver gather that results from transforming $r_m(t)$ from the s-t domain to the f-k domain.

The summand $R_m(\omega)e^{-i(k_x x_m + k_y y_m)} A_m(\omega, k_x, k_y) D_{g_m}(k_z)$ in Equation (14) represents a corrected common-receiver trace free of the source-wavefield response generated by the source elements associated with the common-receiver trace $R_m(\omega)$ and free of source ghost effects that contaminate the common-receiver trace $R_m(\omega)$. The result, $R_e(\omega, k_x, k_y)$, is a corrected common-receiver gather in the f-k domain free of both the source wavefield responses and source ghost effects that contaminate the common-receivers traces comprising the common-receiver gather. In other words, the common-receiver gather $R_e(\omega, k_x, k_y)$ is the response of the subterranean formation recorded in the common-receiver gather free of both the source wavefield responses and source ghost effects.

The temporal length of the time windows may be used to estimate the depth of reflections within the subterranean formation that form a common-receiver gather. Shorter temporal lengths may be used to construct common-receiver gathers that represent shallow reflections within the subterranean formation. On the other hand, longer temporal lengths may be used to construct common-receiver gathers that represent deeper reflections within the subterranean formation.

The spatial extent of subsets of source elements associated with a time window may also depends on the temporal length of the time window and on the survey vessel speed. For example, the longer the temporal length of a time window applied to a common-receiver-location trace, the larger the spatial extent of the subset of source elements associated with the time window. The spatial extent of a subset of the source elements may effect the source wavefield response of the subterranean formation to the source wavefield generated by the subset and effects the spectral resolution of the resulting seismic data. The full range of subset lengths may be available within the dataset. As a result, disclosed methods may generate a series of common-receiver gathers with time windows of different temporal lengths. The common-receiver gathers may then be combined as a weighted average to optimize the combined output spectrum.

Figure 13:
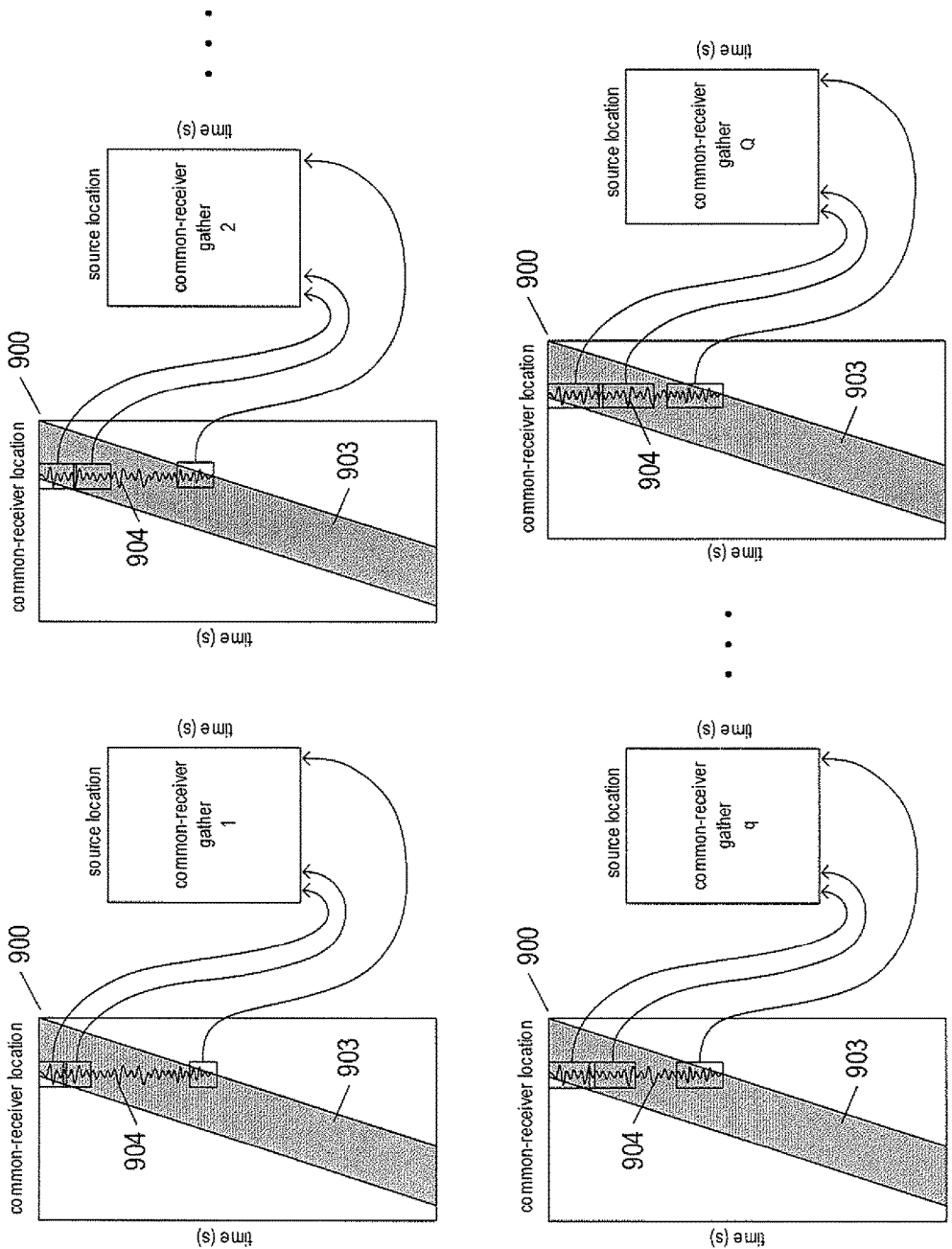
FIG. 13 shows example common-receiver gathers generated for different temporal length time windows applied to the same common-receiver-location trace of a near-continuous wavefield in approximately stationary-receiver locations.

The operations described above with reference to Equations (8)-(14) may be repeated for Q different temporal lengths of the time windows applied to a common-receiver-location gather, where Q represents the number of temporal lengths of time windows. FIG. 13 shows an example of Q common-receiver gathers generated for Q different temporal length time windows applied to the same common-receiver-location trace 904 of the near-continuous wavefield in approximately stationary-receiver locations 900. In the example of FIG. 13, a different common-receiver gather with index q is computed for Q temporal lengths of time window as described above with reference to FIGS. 12A-12D. For example, a common-receiver gather 1 is generated for the shortest temporal length of time windows applied the common-receiver-location trace 904 and a final common-receiver gather Q is generated for the longest temporal length of time windows applied to the same common-receiver-location trace 904.

For each common-receiver gather generated from a common-receiver-location trace, a common-receiver gather $R_{e_q}(\omega, k_x, k_y)$ may be computed as described above with reference to Equations (8)-(14), where the subscript q denotes the associated common-receiver gather q (i.e., temporal length). The $R_{e_q}(\omega, k_x, k_y)$ may be combined to compute a weighted-average common-receiver gather:

$$R^B_{eq}(\omega, k_x, k_y) = \frac{\sum_q^Q R_{e_q}(\omega, k_x, k_y) \overline{W}_q(\omega, k_x, k_y)}{\sum_q^Q W_q(\omega, k_x, k_y) + \varepsilon} \quad (15)$$

where
$W_q(\omega, k_x, k_y) = \sum_m |S_{qm}(\omega, k_x, k_y)|^2$ are weights; and
$S_{qm}(\omega, k_x, k_y)$ the source-response wavefield for common-receiver trace m and temporal length q.

The broadband common-receiver gather $R^B_{eq}(\omega, k_x, k_y)$ provides an optimum broadband representation of seismic data produced by a subset of source elements.

In an alternative implementation, the source wavefield emitted by a subset of source elements may include source-ghost effects given by:

$$S_{g_m}(\omega, k_x, k_y) = \sum_n S_n(\omega) e^{-i(k_x x_n^s + k_y y_n^s)} \left(e^{ik_z z_n^s} + r' e^{-ik_z z_n^s}\right) \quad (16)$$

where ($e^{ik_z z_n^s} + re^{-ik_z z_n^s}$) is a source-ghost correction for source element n.

A source-wavefield-deconvolution operator with source ghost effects corrections applied to the mth common-receiver trace of the common-receiver gather is given by:

$$A_{g_m}(\omega, k_x, k_y) = \frac{\overline{S}_{g_m}(\omega, k_x, k_y)}{|S_{g_m}(\omega, k_x, k_y)|^2 + \varepsilon} \quad (17)$$

where $\overline{S}_{g_m}(\omega, k_x, k_y)$ is the complex conjugate of $S_{g_m}(\omega, k_x, k_y)$.

The source-wavefield response and source ghost effects recorded in a common-receiver gather may be removed by first transforming the common-receiver gather from the s-t domain to the f-k domain using an FFT or a DFT followed by applying the source-wavefield-deconvolution operator with source ghost effects given by Equation (16) corrections to obtain:

$$R_e(\omega, k_x, k_y) = \sum_m R_m(\omega) e^{-i(k_x x_m + k_y y_m)} A_{g_m}(\omega, k_x, k_y) \quad (18)$$

Figure 14:
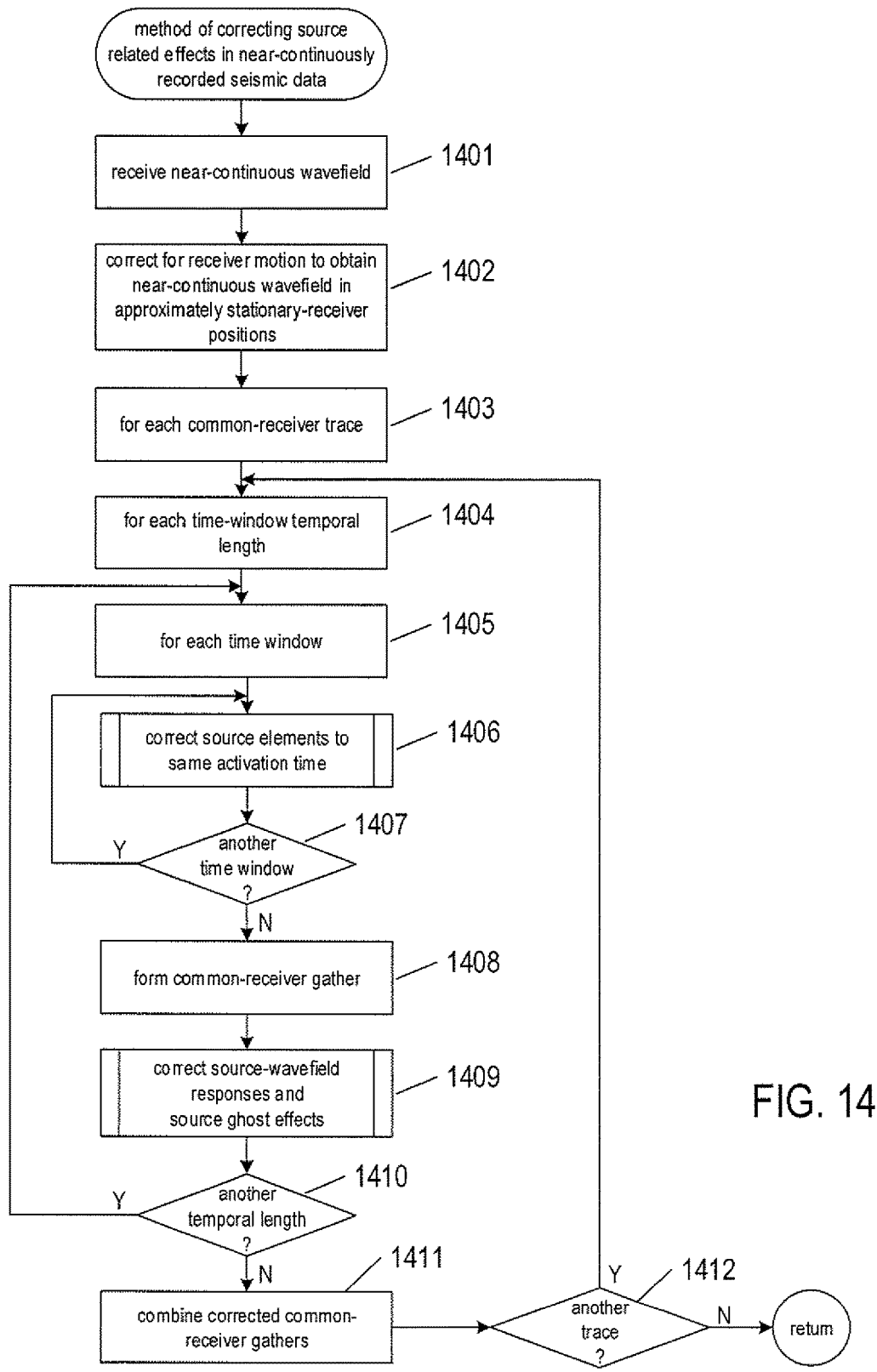
FIG. 14 shows a control-flow diagram of a method of correcting source related effects in near-continuously recorded seismic data.

FIG. 14 shows a control-flow diagram of a method of correcting source related effects in near-continuously recorded seismic data. In block 1401, a near-continuously recorded wavefield of seismic data measured by pressure sensors or particle motion sensors is received as described above with reference to FIG. 8. The near-continuous wavefield may be stored in a data-storage device as a single data structure or as a series of smaller data structures. In block 1402, a distance-correction operator is applied to the near-continuous wavefield in order to generate a near-continuous wavefield in approximately stationary-receiver locations as described above with reference to FIG. 9. A for-loop beginning with block 1403 repeats the computational operations of blocks 1404-1412 for each common-receiver-location trace of the near-continuous wavefield in approximately stationary-receiver locations. A for-loop beginning with block 1404 repeats the computational operations of blocks 1405-1410 for each temporal length of the time windows applied to a common-receiver-location trace. A for-loop beginning with block 1405 repeats the computational operations of blocks 1406-1407 for the seismic data in each time window applied to the common-receiver-location trace. In block 1406, a routine "correct source elements to same activation time" is called to correct the seismic data in a time window as if the source elements associated with the time window were activated at the same time. In decision block 1407, block 1406 is repeated for another time window applied to the same common-receiver-location trace. Otherwise, control flows to block 1408. In block 1408, a common-receiver gather is formed as described above with reference to FIG. 12D. In block 1409, a routine "correct source-wavefield response and source ghost effects" is called to correct source-wavefield response and source ghost effects in the common-receiver gather formed in block 1408. In decision block 1410, the computational operations represented by blocks 1405-1409 are repeated for another temporal length of time windows, as described above with reference to FIG. 13. Otherwise, control flows to block 1411, in which common-receiver gather are combined using a weighted as described above with reference to Equation (15). In decision block 1412, the computational operations of blocks 1404-1411 are repeated for another common-receiver-location trace of the near-continuous wavefield in approximately stationary-receiver locations.

Figure 15:
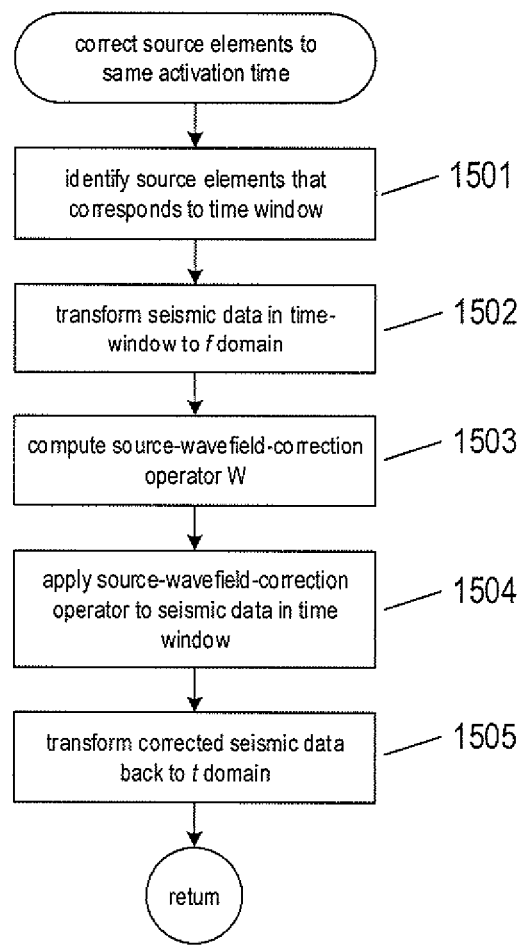
FIG. 15 shows a flow diagram of the routine "correct subset source elements to same activation time" called in FIG. 14.

FIG. 15 shows a flow diagram of the routine "correct source elements to same activation time" called in block 1406 of FIG. 14. In block 1501, a subset of source elements that correspond to the time window are identified as described above with reference to FIG. 11. In block 1502, the seismic data in the time window is transformed from the time domain to the frequency domain as described above with reference to Equation (9). In block 1503, a source-wavefield-correction operator is computed as described above with reference to Equation (8). In block 1504, the source-wavefield-correction operator is applied to the seismic data in the time window. In block 1505, the source-wavefield corrected seismic data is transformed back from the frequency domain to the time domain.

Figure 16:
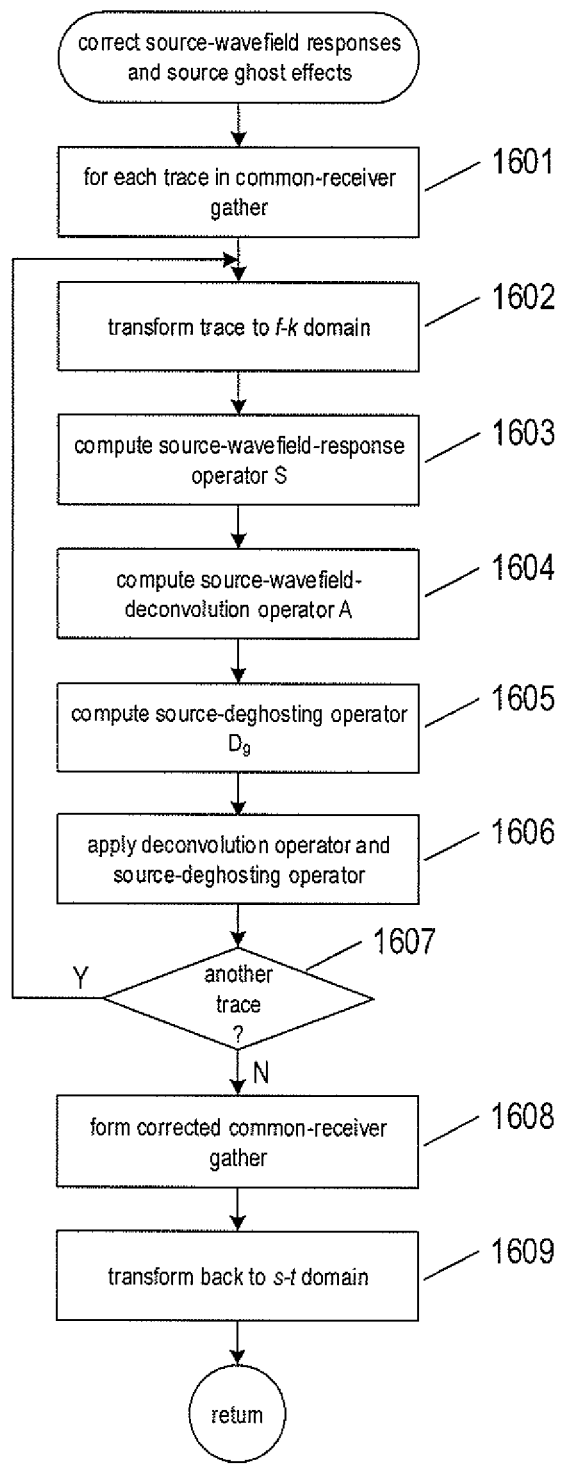
FIG. 16 shows a control-flow diagram of the routine "correct subset responses and source ghost effects" called in FIG. 14.

FIG. 16 shows a control-flow diagram of the routine "correct source-wavefield responses and source ghost effects" called in block 1409 of FIG. 14. A for-loop beginning with block 1601 repeats the computational operations of represented by blocks 1602-1608 for each trace in the common-receiver gather formed in block 1408 of FIG. 14. In block 1602, a common-receiver trace is transformed from the s-t domain to the f-k domain. In block 1603, a source-wavefield-response operator is computed for the source elements associated with the trace as described above with reference to Equation (12). In block 1604, a source-wavefield deconvolution operator is computed as described above with reference to Equation (11). In block 1605, a source-deghosting operator is computed as described above with reference to Equation (13). In block 1606, the source-wavefield deconvolution operator and the source-deghosting operator correct source-wavefield responses and source ghost effects in the common-receiver trace as represented by the summand in Equation (14). In decision block 1607, the computational operations represented by blocks 1602-1602 are repeated for another common-receiver trace. Otherwise, control flows to block 1608. In block 1608, the corrected common-receiver traces are summed to a corrected common-receiver gather in f-k domain as described above with reference to Equation (14). In block 1609, the corrected common-receiver gather formed in block 1608 is transformed back from the f-k domain to the s-t domain.

Figure 17:
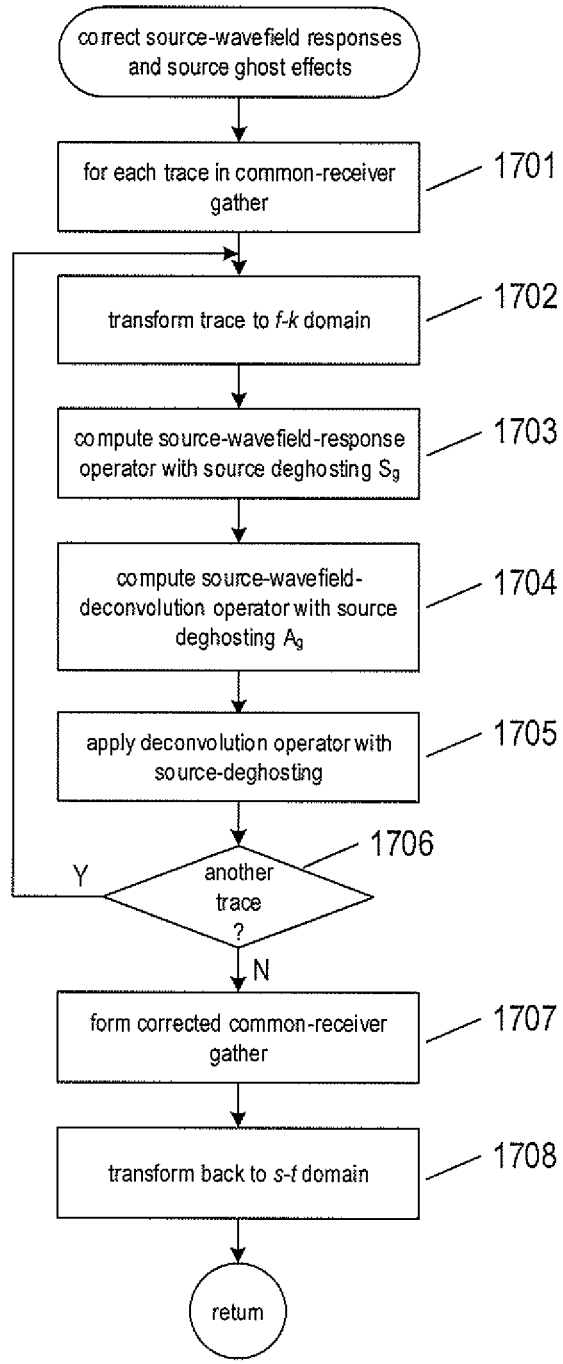
FIG. 17 shows a control-flow diagram of the routine "correct subset responses and source ghost effects" called in FIG. 14.

FIG. 17 shows a control-flow diagram of the routine "correct subset responses and source ghost effects" called in block 1409 of FIG. 14. FIG. 17 is an alternative method of computing subset responses and source ghost effects. A for-loop beginning with block 1701 repeats the computational operations represented by blocks 1702-1706 for each trace of the common-receiver gather formed in block 1408 of FIG. 14. In block 1702, the common-receiver trace is transformed from the s-t domain to the f-k domain. In block 1703, a source-wavefield response that includes a source-ghost correction is computed as described above with reference to Equation (16). In block 1704, a source-wavefield-deconvolution operator with source-ghost correction is computed as described above with reference to Equation (17). In block 1705, the source-wavefield deconvolution operator with source-ghost correction is used to correct source-wavefield responses and source-ghost effects in the common-receiver trace as described above with reference to Equation (18). In decision block 1706, the computational operations represented by blocks 1702-1705 are repeated for another common-receiver trace. Otherwise, control flows to block 1707. In block 1707, corrected common-receiver traces are summed to form a corrected common-receiver gather in f-k domain as described above with reference to Equation (14). In block 1708, the corrected common-receiver gather formed in block 1707 is transformed back from the f-k domain to the s-t domain.

Figure 18:
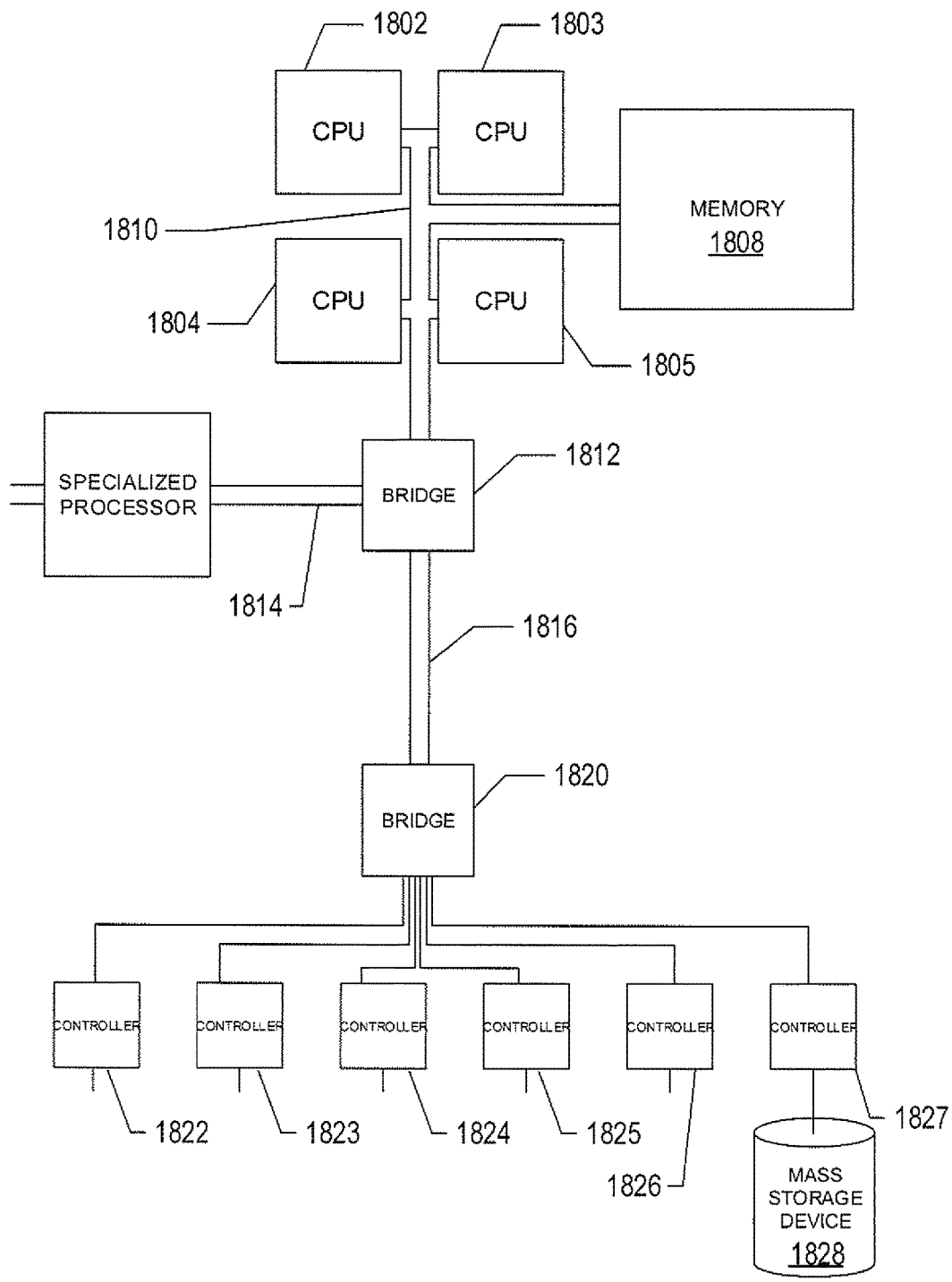
FIG. 18 shows an example of a generalized computer system that executes efficient methods of source subset response correction and source deghosting applied to near-continuous wavefields.

FIG. 18 shows an example of a generalized computer system that executes efficient methods of source subset response correction and source deghosting applied to near-continuous wavefields and therefore represents a geophysical-analysis data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture.

The computer system contains one or multiple central processing units ("CPUs") 1802-1805, one or more electronic memories 1808 interconnected with the CPUs by a CPU/memory-subsystem bus 1810 or multiple busses, a first bridge 1812 that interconnects the CPU/memory-subsystem bus 1810 with additional busses 1814 and 1816, or other types of high-speed interconnection media, including multiple, high-speed serial interconnects. The busses or serial interconnections, in turn, connect the CPUs and memory with specialized processors, such as a graphics processor 1818, and with one or more additional bridges 1820, which are interconnected with high-speed serial links or with multiple controllers 1822-1827, such as controller 1827, that provide access to various different types of computer-readable media, such as computer-readable medium 1828, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1828 is a data-storage device, including electronic memory, optical or magnetic disk drive, USB drive, flash memory and other such data-storage device. The computer-readable medium 1828 can be used to store machine-readable instructions that encode the computational methods described above and can be used to store encoded data, during store operations, and from which encoded data can be retrieved, during read operations, by computer systems, data-storage systems, and peripheral devices.

The mathematical equations and gathers presented above are not, in any way, intended to mean or suggest an abstract idea or concept. Instead the mathematical equations and gathers described above represent actual physical and concrete concepts and properties of materials in existence. The mathematical equations and methods described above are ultimately implemented on physical computer hardware, data-storage devices, and communications systems in order to obtain results that also represent physical and concrete concepts of materials that are in existence. For example, as explained above, an actual pressure wavefield emanating from an actual subterranean formation after being illuminated with an acoustic signal is composed of actual physical pressure wavefield that are sampled using physical and concrete pressure and particle motion sensors. The pressure sensors in turn produce physical electrical or optical signals that encode pressure wavefield data that is physically recorded on physical data-storage devices and undergoes computational processing using hardware as describe above to obtain seismic data that may be displayed, or subjected to further geophysical data processing, in order to interpret the physical structure and composition of the subterranean formation, such as in monitoring production of, or locating, an actual hydrocarbon deposit within the subterranean formation.

Any of the near-continuous wavefield in approximately stationary-receiver locations and corrected common-receivers gathers computed from such wavefields as described above, and any combination thereof, may form a geophysical data product indicative of certain properties of a subterranean formation. The geophysical data product may include processed seismic geophysical data and may be stored on a non-transitory computer-readable medium as described above. The geophysical data product may be produced offshore (i.e. by equipment on the survey vessel 102) or onshore (i.e. at a computing facility on land) either within the United States or in another country. When the geophysical data product is produced offshore or in another country, it may be imported onshore to a data-storage facility in the United States. Once onshore in the United States, geophysical analysis may be performed on the data product.

Although the above disclosure has been described in terms of particular implementations, it is not intended that the disclosure be limited to these implementations. Modifications within the spirit of this disclosure will be apparent to those skilled in the art. For example, any of a variety of different implementations may be obtained by varying any of many different design and development parameters, including programming language, underlying operating system, modular organization, control structures, data structures, and other such design and development parameters. Thus, the present disclosure is not intended to be limited to the implementations shown herein but is to be accorded the widest scope consistent with the principles and novel features disclosed herein.

The invention claimed is:

1. A process for generating an image of a subterranean formation using marine seismic techniques in which source elements of a source are activated at different source activation times and at different source locations above the subterranean formation and reflected wavefields from the subterranean formation are near-continuously recorded as seismic data, the specific improvement comprising:
   computing common-receiver-location traces from the near-continuously recorded seismic data, each common-receiver-location trace comprising a portion of the near-continuously recorded seismic data recorded by different receivers at a same receiver location;
   for each common-receiver-location trace, computing a common-receiver gather of common-receiver traces, each common-receiver trace computed by correcting seismic data in a time window of a common-receiver-location trace as if the source elements activated in the time window had been activated at the same time;
   computing a source-wavefield-deconvolution operator based on notional source signatures of the source elements and a source-deghosting operator based on depths of source elements of the source and reflectivity of a free surface of the body of water;
   applying the source-wavefield-deconvolution operator and the source-deghosting operator to each common-receiver trace of the common-receiver gathers to obtain corrected common-receiver gathers, each corrected common-receiver gather free of source-wavefield responses and source ghost effects produced by the source elements;
   for each common-receiver-location trace, computing a broadband common-receiver gather substantially free of source-wavefield responses and source ghost effects by combining the corrected common-receiver gathers associated with the common-receiver-location trace; and
   generating an image of the subterranean formation based at least in part on the broadband common-receiver gathers.

2. The process of claim 1, wherein computing the common-receiver-location traces from the near-continuously recorded seismic data comprises applying a distance-correction operator that associates each time sample of the near-continuously recorded seismic data with a location where the time sample was measured by one of the receivers.

3. The process of claim 1, wherein applying the source-wavefield-deconvolution operator and the source-deghosting operator to obtain the corrected common-receiver gather further comprises:
for each of a number of different temporal lengths of a series of time windows,
applying the series of time windows to a common-receiver-location trace;
identifying source elements that correspond to the seismic data in each time window;
correcting seismic data in each time window as if the source elements that correspond to the seismic data were activated at the same time;
forming a common-receiver gather from the corrected seismic data in each time window; and
applying the source-wavefield-deconvolution operator and the source-deghosting operator to each common-receiver trace of the common-receiver gather within the temporal length to remove a source-wavefield response and source-ghost effects from the common-receiver gather and generate a corrected common-receiver gather associated with the temporal length.

4. The process of claim 3, wherein correcting the seismic data in each time window further comprises time-shifting the seismic data in each time window as if the source elements associated with the seismic data in each time window had been activated at the same activation time.

5. The process of claim 3, wherein removing the source-wavefield response and the source-ghost effects from the common-receiver gather further comprises:
deconvolving the source-wavefield response for each common-receiver trace of the common-receiver gather based on a source-wavefield response of the source elements associated with each common-receiver trace; and
source deghosting each common-receiver trace of the common-receiver gather based on the depths of the source elements associated with each common-receiver trace.

6. The process of claim 1, wherein computing the broadband common-receiver gather substantially free of source-wavefield responses and source ghost effects by combining the corrected common-receiver gathers comprises:
computing a source-response wavefield for each common-receiver trace and temporal length of each common-receiver trace;
computing weights as a sum of the source-response wavefields squared; and
computing a weighted average of corrected common-receiver gathers based on the weights.

7. The process of claim 1 executed on a programmable computer programmed to execute the method.

8. The process of claim 1, wherein the wavefield gathers form a geophysical data product, further comprising recording the geophysical data product on a physical, non-volatile computer-readable medium suitable for importing onshore.

9. The process of claim 8, further comprising performing geophysical analysis onshore on the geophysical data product.

10. A system for generating an image of a subterranean formation, the system comprising:
a computer system comprising:
one or more processors;
one or more data-storage devices; and
one or more routines stored in one or more of data-storage devices that when executed by the one or more processors controls the system to carry out
computing common-receiver-location traces from near-continuously recorded seismic data, each common-receiver-location trace comprising a portion of the near-continuously recorded seismic data recorded by different receivers at a same receiver location;
for each common-receiver-location trace, computing a common-receiver gather of common-receiver traces, each common-receiver trace computed by correcting seismic data in a time window of a common-receiver-location trace as if the source elements activated in the time window had been activated at the same time;
computing a source-wavefield-deconvolution operator based on notional source signatures of the source elements and a source-deghosting operator based on depths of source elements of the source and reflectivity of a free surface of the body of water;
applying the source-wavefield-deconvolution operator and the source-deghosting operator to each common-receiver trace of the common-receiver gathers to obtain corrected common-receiver gathers;
for each common-receiver-location trace, computing a broadband common-receiver gather substantially free of source-wavefield responses and source ghost effects by combining the corrected common-receiver gathers associated with the common-receiver-location trace; and
generating an image of the subterranean formation based at least in part on the broadband common-receiver gathers.

11. The system of claim 10, wherein computing the common-receiver-location traces from the near-continuously recorded seismic data comprises applying a distance-correction operator that associates each time sample of the near-continuously recorded seismic data with a location where the time sample was measured by one of the receivers.

12. The system of claim 10, applying the source-wavefield-deconvolution operator and the source-deghosting operator to obtain the corrected common-receiver gather further comprises:
for each of a number of different temporal lengths of a series of time windows,
applying the series of time windows to a common-receiver-location trace;
identifying source elements that correspond to the seismic data in each time window;
correcting seismic data in each time window as if the source elements that correspond to the seismic data were activated at the same time;
forming a common-receiver gather from the corrected seismic data in each time window; and
applying the source-wavefield-deconvolution operator and the source-deghosting operator to each common-receiver trace of the common-receiver gather within the temporal length to remove a source-wavefield response and source-ghost effects from the common-receiver gather to and generate a corrected common-receiver gather associated with the temporal length.

13. The system of claim 12, wherein correcting the seismic data in each time window further comprises time-shifting the seismic data in each time window as if the source elements associated with the seismic data in each time window had been activated at the same activation time.

14. The system of claim 12, wherein removing the source-wavefield response and the source-ghost effects from the common-receiver gather further comprises
deconvolving the source-wavefield response for each common-receiver trace of the common-receiver gather based on a source-wavefield response of the source elements associated with each common-receiver trace; and
source deghosting each common-receiver trace of the common-receiver gather based on the depths of the source elements associated with each common-receiver trace.

15. The system of claim 10, wherein computing the broadband common-receiver gather substantially free of source-wavefield responses and source ghost effects by combining the corrected common-receiver gathers comprises:
computing a source-response wavefield for each common-receiver trace and temporal length of each common-receiver trace;
computing weights as a sum of the source-response wavefields squared; and
computing a weighted average of corrected common-receiver gathers based on the weights.

16. A non-transitory computer-readable medium having machine-readable instructions encoded thereon for enabling one or more processors of a computer system to perform the operations of
computing common-receiver-location traces from near-continuously recorded seismic data, each common-receiver-location trace comprising a portion of the near-continuously recorded seismic data recorded by different receivers at a same receiver location;
for each common-receiver-location trace, computing a common-receiver gather of common-receiver traces, each common-receiver trace computed by correcting seismic data in a time window of a common-receiver-location trace as if the source elements activated in the time window had been activated at the same time;
computing a source-wavefield-deconvolution operator based on notional source signatures of the source elements and a source-deghosting operator based on depths of source elements of the source and reflectivity of a free surface of the body of water;
applying the source-wavefield-deconvolution operator and the source-deghosting operator to each common-receiver trace of the common-receiver gathers to obtain corrected common-receiver gathers;
for each common-receiver-location trace, computing a broadband common-receiver gather substantially free of source-wavefield responses and source ghost effects by combining the corrected common-receiver gathers associated with the common-receiver-location trace; and
generating an image of the subterranean formation based at least in part on the broadband common-receiver gathers.

17. The medium of claim 16, wherein computing the common-receiver-location traces from the near-continuously recorded seismic data comprises applying a distance-correction operator that associates each time sample of the near-continuously recorded seismic data with a location where the time sample was measured by one of the receivers.

18. The medium of claim 16, wherein applying the source-wavefield-deconvolution operator and the source-deghosting operator to obtain the corrected common-receiver gather further comprises:
for each of a number of different temporal lengths of a series of time windows,
applying the series of time windows to a common-receiver-location trace;
identifying source elements that correspond to the seismic data in each time window;
correcting seismic data in each time window as if the source elements that correspond to the seismic data were activated at the same time;
forming a common-receiver gather from the corrected seismic data in each time window; and
applying the source-wavefield-deconvolution operator and the source-deghosting operator to each common-receiver trace of the common-receiver gather within the temporal length to remove a source-wavefield response and source-ghost effects from the common-receiver gather and generate a corrected common-receiver gather associated with the temporal length.

19. The medium of claim 18, wherein correcting the seismic data in each time window further comprises time-shifting the seismic data in each time window as if the source elements associated with the seismic data in each time window had been activated at the same activation time.

20. The medium of claim 18, wherein removing the source-wavefield response and the source-ghost effects from the common-receiver gather further comprises
deconvolving the source-wavefield response for each common-receiver trace of the common-receiver gather based on a source-wavefield response of the source elements associated with each common-receiver trace; and
source deghosting each common-receiver trace of the common-receiver gather based on the depths of the source elements associated with each common-receiver trace.

21. The medium of claim 16, wherein computing the broadband common-receiver gather substantially free of source-wavefield responses and source ghost effects by combining the corrected common-receiver gathers comprises:
computing a source-response wavefield for each common-receiver trace and temporal length of each common-receiver trace;
computing weights as a sum of the source-response wavefields squared; and computing a weighted average of corrected common-receiver gathers based on the weights.

* * * * *